(12) United States Patent
Fekety et al.

(10) Patent No.: US 11,603,328 B2
(45) Date of Patent: Mar. 14, 2023

(54) METHOD FOR INCREASING FRACTURE TOUGHNESS OF GLASS RIBBONS

(71) Applicant: CORNING INCORPORATED, Corning, NY (US)

(72) Inventors: Curtis Robert Fekety, Corning, NY (US); Yunfeng Gu, Painted Post, NY (US); Jinfa Mou, Painted Post, NY (US); Weijun Niu, Painted Post, NY (US); Matthew Daniel Trosa, Horseheads, NY (US); Rui Zhang, Elmira, NY (US); Zheming Zheng, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 282 days.

(21) Appl. No.: 16/765,303

(22) PCT Filed: Nov. 20, 2018

(86) PCT No.: PCT/US2018/061955
§ 371 (c)(1),
(2) Date: May 19, 2020

(87) PCT Pub. No.: WO2019/100049
PCT Pub. Date: May 23, 2019

(65) Prior Publication Data
US 2020/0283326 A1 Sep. 10, 2020

Related U.S. Application Data

(60) Provisional application No. 62/588,623, filed on Nov. 20, 2017.

(51) Int. Cl.
*C03B 33/07* (2006.01)
*C03B 17/06* (2006.01)
(Continued)

(52) U.S. Cl.
CPC .......... *C03B 33/074* (2013.01); *C03B 17/064* (2013.01); *C03B 33/0215* (2013.01);
(Continued)

(58) Field of Classification Search
None
See application file for complete search history.

(56) References Cited

U.S. PATENT DOCUMENTS 3,338,696 A   8/1967   Dockerty
3,682,609 A   8/1972   Dockerty
(Continued)

FOREIGN PATENT DOCUMENTS

EP   2377832 A1   10/2011
FR   2582295 A  * 11/1986   ........... C03C 17/002
(Continued)

OTHER PUBLICATIONS

Sinapi et al., WO 2014060499 machine translation, Method for Manufacturing a Sheet of Frosted Glass, Apr. 2014 (Year: 2014).*
(Continued)

*Primary Examiner* — Queenie S Dehghan
(74) *Attorney, Agent, or Firm* — Kevin M. Able

(57) ABSTRACT

Methods for producing a glass sheet are provided. The methods can include forming a glass ribbon from molten glass, applying a polymer precursor to at least a portion of a first or second major surface of the glass ribbon, curing the polymer precursor to form a polymer coating, and separating the glass ribbon to produce at least one glass sheet. Glass ribbons and glass sheets produced by these methods are also disclosed.

12 Claims, 14 Drawing Sheets

(51) Int. Cl.
  *C03B 33/02* (2006.01)
  *C03C 17/00* (2006.01)
  *C03C 17/32* (2006.01)

(52) U.S. Cl.
  CPC ............ *C03C 17/002* (2013.01); *C03C 17/32* (2013.01); *C03C 2218/112* (2013.01); *C03C 2218/355* (2013.01)

(56) References Cited

U.S. PATENT DOCUMENTS

| | | |
|---|---|---|
| 9,272,946 B2 | 3/2016 | Chang et al. |
| 9,428,302 B2 | 5/2016 | Fadeev et al. |
| 9,399,593 B2 | 7/2016 | Abramov et al. |
| 10,280,334 B2 | 5/2019 | Chou et al. |
| 2006/0280920 A1 | 12/2006 | Abbott |
| 2016/0264457 A1 | 9/2016 | Xu |

FOREIGN PATENT DOCUMENTS

| | | | |
|---|---|---|---|
| FR | 2582295 A1 | 11/1986 | |
| JP | 2014-152327 A | 8/2014 | |
| TW | 201033148 A | 9/2010 | |
| TW | 201609377 A | 3/2016 | |
| WO | 2006/135585 A2 | 12/2006 | |
| WO | WO-2016037746 A1 * | 3/2016 | ........... C03C 17/002 |
| WO | 2016/174411 A1 | 11/2016 | |

OTHER PUBLICATIONS

Taiwanese Patent Application No. 107141197, Office Action, dated Feb. 21, 2022, 1 page; Taiwanese Patent Office.
International Search Report and Written Opinion of the International Searching Authority; PCT/US2018/061955; dated Feb. 15, 2019; 12 Pages; European Patent Office.
Liaw et al; "Advanced Polyimide Materials: Syntheses, Physical Properties and Applications" ; Progress in Polymer Science (2012), 37(7), 907-974.

* cited by examiner

METHOD FOR INCREASING FRACTURE TOUGHNESS OF GLASS RIBBONS

CROSS REFERENCE TO RELATED APPLICATIONS

This application claims the benefit of priority under 35 U.S.C. § 371 of International Application No. PCT/US18/61955, filed on Nov. 20, 2018, which claims the benefit of priority of U.S. Provisional Application Serial No. 62/588,623 filed on Nov. 20, 2017 the contents of which are relied upon and incorporated herein by reference in their entirety as if fully set forth below.

FIELD OF THE DISCLOSURE

The present disclosure relates generally to methods for increasing the fracture toughness of glass ribbons, and more particularly to methods comprising applying a heat-resistant polymer coating to at least a portion of a glass ribbon in a glass manufacturing apparatus, such as a fusion draw machine.

BACKGROUND

High-performance display devices, such as liquid crystal displays (LCDs) and plasma displays, are commonly used in various electronics, such as cell phones, laptops, electronic tablets, televisions, and computer monitors. Currently marketed display devices can employ one or more high-precision glass sheets, for example, as substrates for electronic circuit components, light guide plates, color filters, or cover glasses, to name a few applications. The leading technology for making such high-quality glass substrates is the fusion draw process, developed by Corning Incorporated, and described, e.g., in U.S. Pat. Nos. 3,338,696 and 3,682,609, which are incorporated herein by reference in their entireties.

The fusion draw process typically utilizes a forming body comprising a trough disposed in an upper portion and a lower portion having a wedge-shaped cross-section with two major forming surfaces sloping downwardly to join at a bottom edge (root). During operation, the trough is filled with molten glass, which is allowed to flow over the trough sides and down along the two forming surfaces as two molten glass streams, which ultimately converge at the root where they fuse together to form a unitary glass ribbon. The glass ribbon can thus have two pristine external surfaces that have not been exposed to the surface of the forming body. The glass ribbon can then be drawn down, cooled, and separated to form a glass sheet having a desired thickness and a pristine surface quality.

The fusion draw process may, however, have various limitations related to residual stress on the glass ribbon being processed. For example, the fusion draw process can produce a glass ribbon with a relatively thin central region and thicker bead regions at the edges. Due to uneven cooling of these thicker bead regions, residual stress can build in the ribbon and may undesirably result in cracking and/or breakage during processing. For laminate fusion processing, e.g., simultaneous fusion draw of two or more ribbons to create a multi-layer structure, the combined thicknesses of the beads of each ribbon can even further increase residual stress on the laminate ribbon.

Residual stress in the glass ribbon or laminate glass ribbon can make it difficult to horizontally or vertically separate the glass ribbon without undesirable cracking. Cracking can occur, e.g., due to scoring and/or bending during the separation process. When cracking occurs during a horizontal separation process (e.g., using a traveling anvil machine (TAM)), the crack can propagate vertically up into the fusion draw machine (FDM), resulting in crack-out and loss of process. When cracking occurs during vertical separation (e.g., using a vertical bead scoring machine (VBS)), the crack often causes product loss and/or potential down time for cleaning. Other factors may increase the tendency of a glass ribbon to crack, such as composition, coefficient of thermal expansion (CTE), and/or ribbon thickness.

Consumer demand for high-performance displays with ever growing size and image quality requirements drives the desire for improved manufacturing processes for producing high-quality, high-precision glass sheets. Accordingly, it would be advantageous to provide methods for forming glass ribbons with increased fracture toughness and/or reduced glass defects caused by residual stress. It would also be advantageous to provide methods for separating glass ribbons that have a higher tendency to crack, e.g., due to composition, CTE, ribbon thickness, or other factors.

SUMMARY

The disclosure relates to methods for forming a glass sheet, the methods comprising melting glass batch materials to form molten glass; processing the molten glass to form a glass ribbon having a first major surface and a second major surface; applying a polymer precursor to at least a portion of at least one of the first major surface or the second major surface, the portion having a surface temperature equal to or greater than 300° C.; curing the polymer precursor to form a polymer coating; and separating the glass ribbon to produce at least one glass sheet. Glass sheets produced by these methods are also disclosed herein.

Further disclosed herein are glass ribbons comprising a first major surface and an opposing second major surface; and a polymer coating disposed on at least a portion of at least one of the first or the second major surfaces, wherein the portion has a surface temperature equal to or greater than 300° C. Glass sheets produced from such glass ribbons are also disclosed herein.

In certain embodiments, applying the polymer precursor comprises applying a solution comprising at least one polymer precursor and at least one solvent. Curing of the polymer precursor may, in some embodiments, comprise in situ thermal curing. According to various embodiments, applying the polymer coating can comprise spray coating. The polymer coating can comprise, for example, at least one polymer chosen from polyimides, polyamides, polysulfones, polybenzimidazoles, silicones, epoxies, and acrylates. An average thickness of the polymer coating can be equal to or less than about 50 µm in non-limiting embodiments.

According to further embodiments, the first and second major surfaces of the glass ribbon each comprise a central region and first and second bead regions, and the polymer coating is applied to at least one of the first or the second bead regions. In certain embodiments, the polymer coating is not applied to the central region of the first or second major surface of the glass ribbon. In other embodiments, the polymer coating is applied to at least a portion of the first major surface and at least a portion of the second major surface. According to various embodiments, separating the glass ribbon can comprise scoring the glass ribbon to produce at least one score line, and the at least one score line may be positioned in a region of the glass ribbon comprising the polymer coating. Separating the glass ribbon may, in non-limiting embodiments, comprise removing at least one bead region from the glass ribbon.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be best understood when read in conjunction with the following drawings, where like structures are indicated with like reference numerals where possible and in which.

DETAILED DESCRIPTION

Figure 1A:
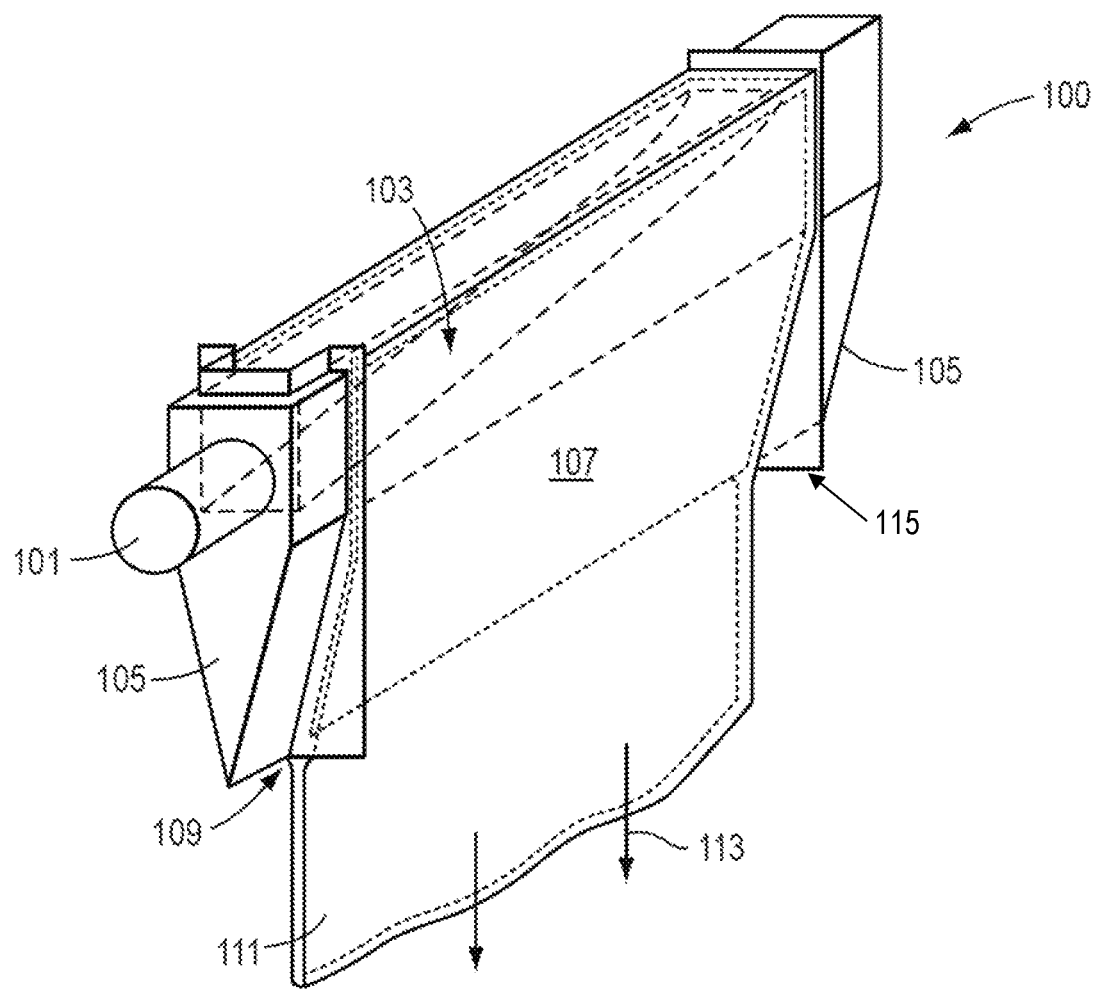
FIG. 1A illustrates an exemplary forming body.

Embodiments of the methods disclosed herein are discussed below with reference to FIGS. 1A-B and FIG. 2, which depict an exemplary forming body and glass manufacturing system, respectively. Referring to FIG. 1A, during a glass manufacturing process, such as a fusion draw process, molten glass can be introduced into a forming body 100 comprising a trough 103 via an inlet 101. Once the trough 103 is filled, the molten glass can flow over the sides of the trough and down the two opposing forming surfaces 107 before fusing together at the root 109 to form a glass ribbon 111. The glass ribbon can then be drawn down in the direction 113 using, e.g., a roller assembly (not shown) and further processed to form a glass sheet. The forming body can further comprise ancillary components such as end caps 105 and/or edge directors 115.

Figure 1B:
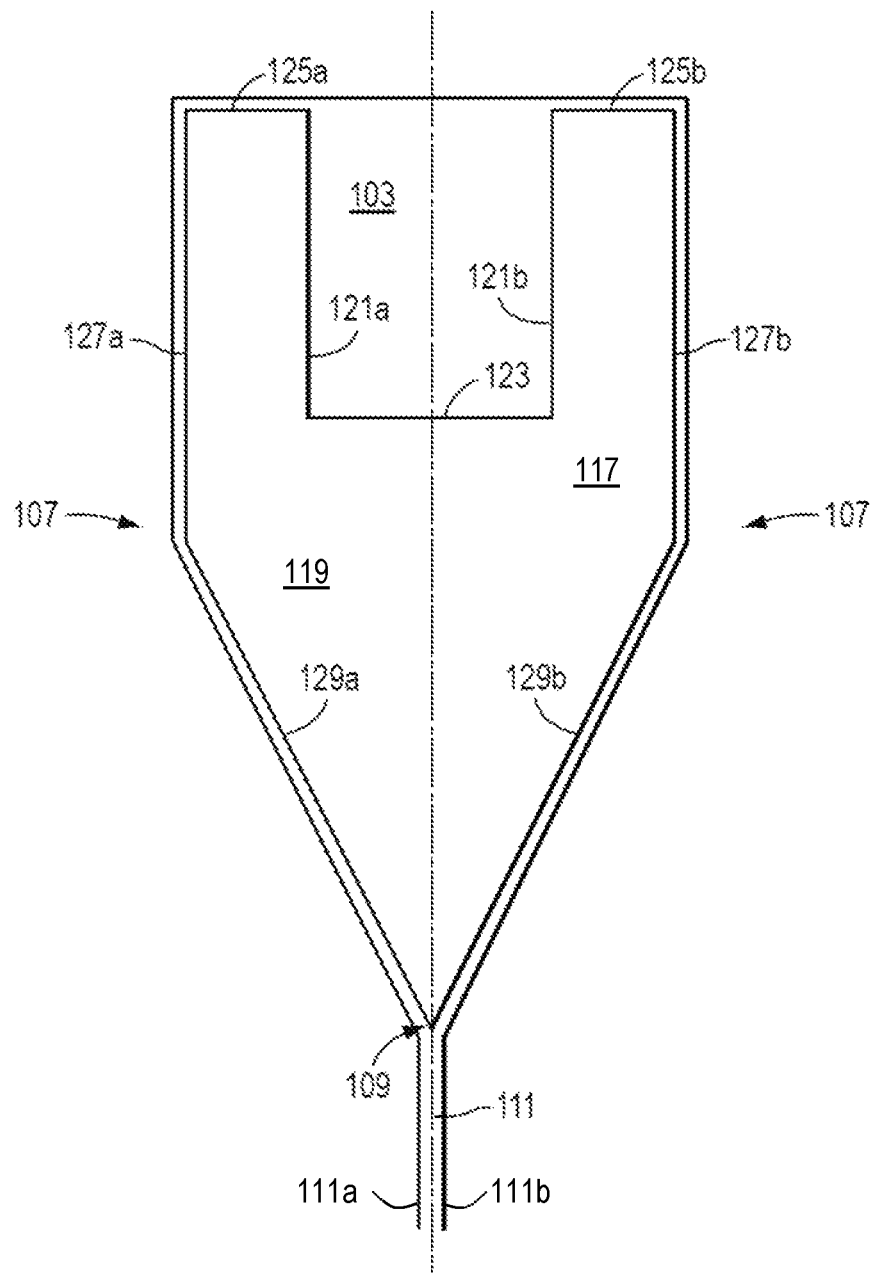
FIG. 1B is a cross-sectional view of the forming body of FIG. 1A.

FIG. 1B provides a cross-sectional view of the forming body of FIG. 1A, in which the forming body 100 can comprise an upper trough-shaped portion 117 and a lower wedge-shaped portion 119. The upper trough-shaped portion 117 can comprise a channel or trough 103 configured to receive the molten glass. The trough 103 can be defined by two trough walls (or weirs) 125a, 125b comprising interior surfaces 121a, 121b, and a trough bottom 123. Although the trough is depicted as having a rectangular cross-section, with the interior surfaces forming approximately 90-degree angles with the trough bottom, other trough cross-sections are envisioned, as well as other angles between the interior surfaces and the bottom of the trough. The weirs 125a, 125b can further comprise exterior surfaces 127a, 127b which, together with the wedge outer surfaces 129a, 129b, can make up the two opposing forming surfaces 107. Molten glass can flow over the weirs 125a, 125b and down the forming surfaces 107 as two glass streams which can then fuse together at the root 109 to form a unitary glass ribbon 111. The glass ribbon 111 can then be drawn down in direction 113 and, in some embodiments, further processed to form a glass sheet. The glass ribbon 111 (and the resulting glass sheet) can comprise a first major surface 111a and an opposing second major surface 111b.

The forming body 100 can comprise any material suitable for use in a glass manufacturing process, for example, refractory materials such as zircon, zirconia, alumina, magnesium oxide, silicon carbide, silicon nitride, silicon oxynitride, xenotime, monazite, and combinations thereof. According to various embodiments, the forming body may comprise a unitary piece, e.g., one piece machined from a single source. In other embodiments, the forming body may comprise two or more pieces bonded, fused, attached, or otherwise coupled together, for instance, the trough-shaped portion and wedge-shaped portion may be two separate pieces comprising the same or different materials. The dimensions of the forming body, including the length, trough depth and width, and wedge height and width, to name a few, can vary depending on the desired application. It is within the ability of one skilled in the art to select these dimensions as appropriate for a particular manufacturing process or apparatus.

Figure 2:
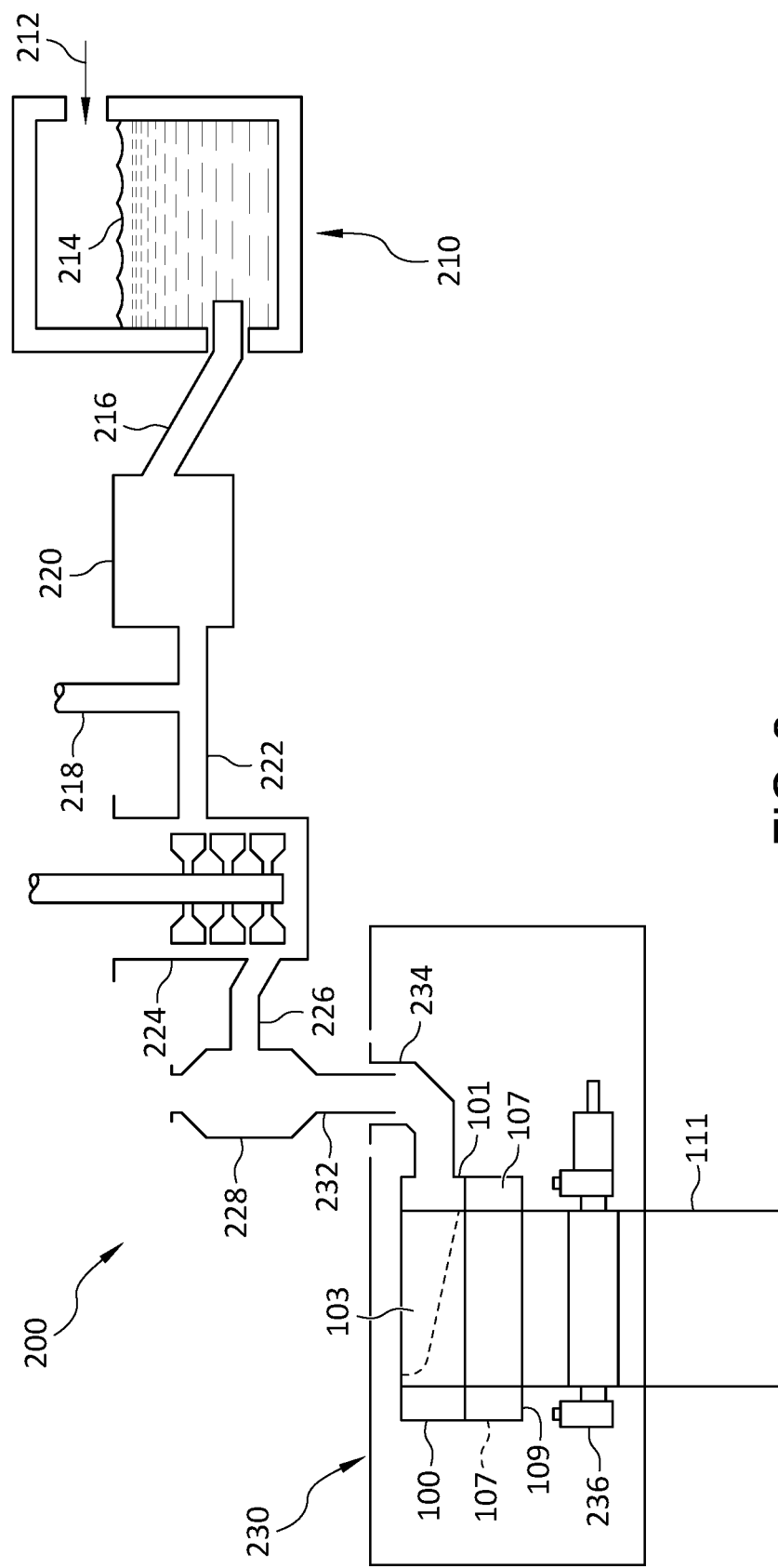
FIG. 2 illustrates an exemplary glass manufacturing apparatus.

FIG. 2 depicts an exemplary glass manufacturing system 200 for producing a glass ribbon 111. The glass manufacturing system 200 can include a melting vessel 210, a fining vessel (e.g., finer tube) 220, a first connecting tube 216 connecting the melting and fining vessel, a mixing vessel 224, and a second connecting tube 222 (with a level probe stand pipe 218 extending therefrom) connecting the fining and mixing vessels, a delivery vessel 228, a third connecting tube 226 connecting the mixing and delivery vessels, a downcomer 232, and a fusion draw machine (FDM) 230, which can include an inlet pipe 234, a forming body 100, and a pull roll assembly 236.

Glass batch materials can be introduced into the melting vessel 210, as shown by arrow 212, to form molten glass 214. The melting vessel 210 can comprise, in some embodiments, one or more walls constructed from refractory ceramic bricks, e.g., fused zirconia bricks. The fining vessel 220 is connected to the melting vessel 210 by the first connecting tube 216. The fining vessel 220 comprises a high temperature processing area that receives the molten glass from the melting vessel 210 and which can remove bubbles from the molten glass. The fining vessel 220 is connected to the mixing vessel 224 by the second connecting tube 222. The mixing vessel 224 is connected to the delivery vessel 228 by the third connecting tube 226. The delivery vessel 228 can deliver the molten glass through the downcomer 232 into the FDM 230.

As described above, the FDM 230 can include an inlet pipe 234, a forming body 100, and a pull roll assembly 236. The inlet pipe 234 receives the molten glass from the downcomer 232, from which the molten glass can flow to the forming body 100. The forming body 100 can include an inlet 101 that receives the molten glass, which can then flow into the trough 103, overflowing over the sides of the trough 103, and running down the two opposing forming surfaces 107 before fusing together at the root 109 to form a glass ribbon 111. In certain embodiments, the forming body 100 can comprise a refractory ceramic, e.g., zircon or alumina ceramic. The pull roll assembly 236 can transport the drawn glass ribbon 111 for further processing by additional optional apparatuses.

For example, a traveling anvil machine (TAM) or a vertical bead scoring machine (VBS), which can include a scoring device for scoring the glass ribbon, such as a mechanical or laser scoring device, may be used to vertically and/or horizontally separate the ribbon 111 into individual sheets, which can be machined, polished, chemically strengthened, and/or otherwise surface treated, e.g., etched, using various methods and devices known in the art. Of course, while the apparatuses and methods disclosed herein are discussed with reference to fusion draw processes and systems, it is to be understood that such apparatuses and methods can also be used in conjunction with other glass forming processes, such as slot-draw, rolling, and float processes, to name a few.

Disclosed herein are glass ribbons comprising a first major surface and an opposing second major surface; and a polymer coating disposed on at least a portion of at least one of the first or the second major surfaces, wherein the portion has a surface temperature equal to or greater than about 300° C. Laminate glass ribbons, e.g., ribbons comprising two or more layers of glass, which can have different chemical compositions and/or physical properties, are also disclosed herein. Glass sheets produced from such glass ribbons are further disclosed herein. Embodiments of the claimed glass ribbons and sheets will be discussed below with non-limiting reference to FIGS. 3-4.

Figure 3:
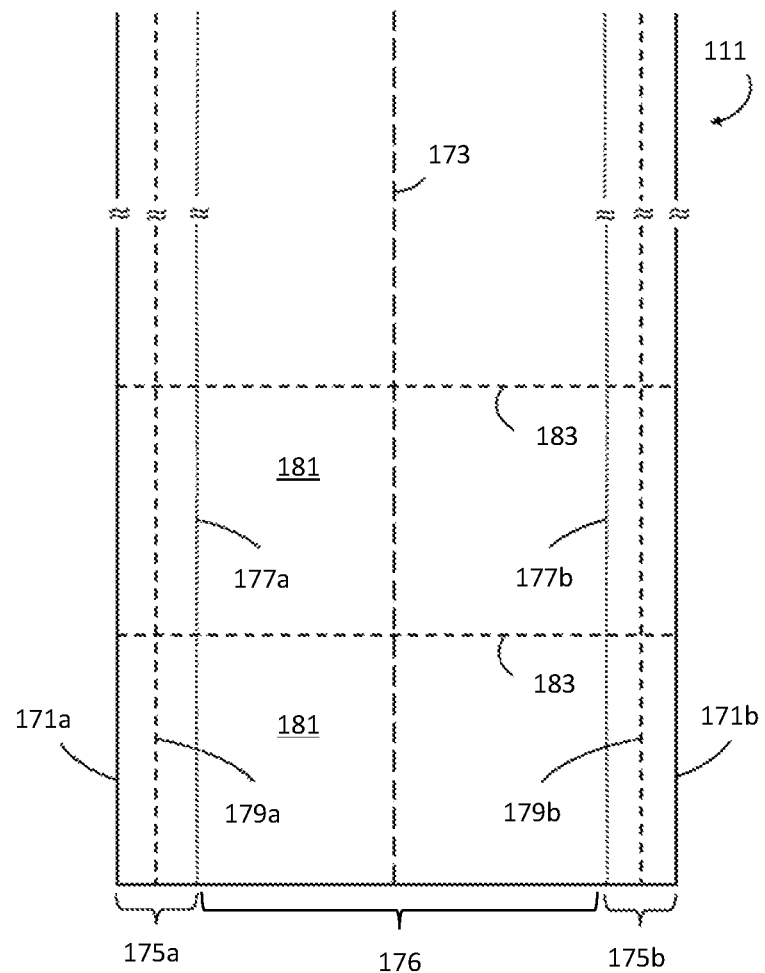
FIG. 3 illustrates a major surface of an exemplary glass ribbon.

FIG. 3 depicts a major surface of an exemplary glass ribbon, which may be produced using the forming body depicted in FIGS. 1A-B and/or the glass manufacturing apparatus depicted in FIG. 2. The major surface may be described interchangeably herein as a "first" or "second" major surface, these descriptions being arbitrary and non-limiting. In various embodiments, the glass ribbon 111 can comprise a first major surface and an opposing second major surface (e.g., as depicted in FIG. 1B), and either or both of these surfaces can have the features described below. For example, the major surface(s) can comprise outer edges 171a, 171b and a vertical centerline 173. Bead regions 175a, 175b may extend from the outer edges 171a, 171b of the glass ribbon 111 toward the centerline 173, and may have an exemplary width extending between edge 171a and line 177a (or from 171b to 177b). A central region 176 of the glass ribbon 111 may extend from line 177a to line 177b. The bead regions may, in some embodiments, comprise accumulated mass having a thickness greater than the central region of the glass ribbon. A bead may, in some embodiments, have a thickness greater than the thickness of the glass ribbon at its centerline, for instance at least about 5% greater, at least 10% greater, at least 20% greater, or more. The bead regions may thus comprise beads having a bead centerline 179a, 179b, at which the bead may be thickest; however, the thickest part of the bead need not be at its center. Furthermore, although bead regions 175a and 175b are depicted in FIG. 3 as symmetrical, they may have different widths and/or bead centerlines and/or thicknesses.

After manufacture, the glass ribbon can be cooled and further processed to produce glass sheets. For example, a traveling anvil machine (TAM) may be used to horizontally score and separate the ribbon 111 into individual sheets 181 along score lines 183. A vertical bead scoring machine (VBS) may also be used to vertically score and separate the ribbon 111, e.g., to remove the beads from the glass ribbon. In further embodiments, other glass separating apparatuses may be used, such as stationary apparatuses. Scoring can be carried out, for example, using one or more mechanical and/or laser devices. Separation of the scored glass into individual sheets can be carried out, in some embodiments, by applying pressure to the score line sufficient to break the glass along the score line, e.g., using mechanical means. The individual pieces of glass sheet that can be further processed, machined, polished, chemically strengthened, and/or otherwise surface treated, e.g., etched, using various methods and devices known in the art.

Figure 4A:
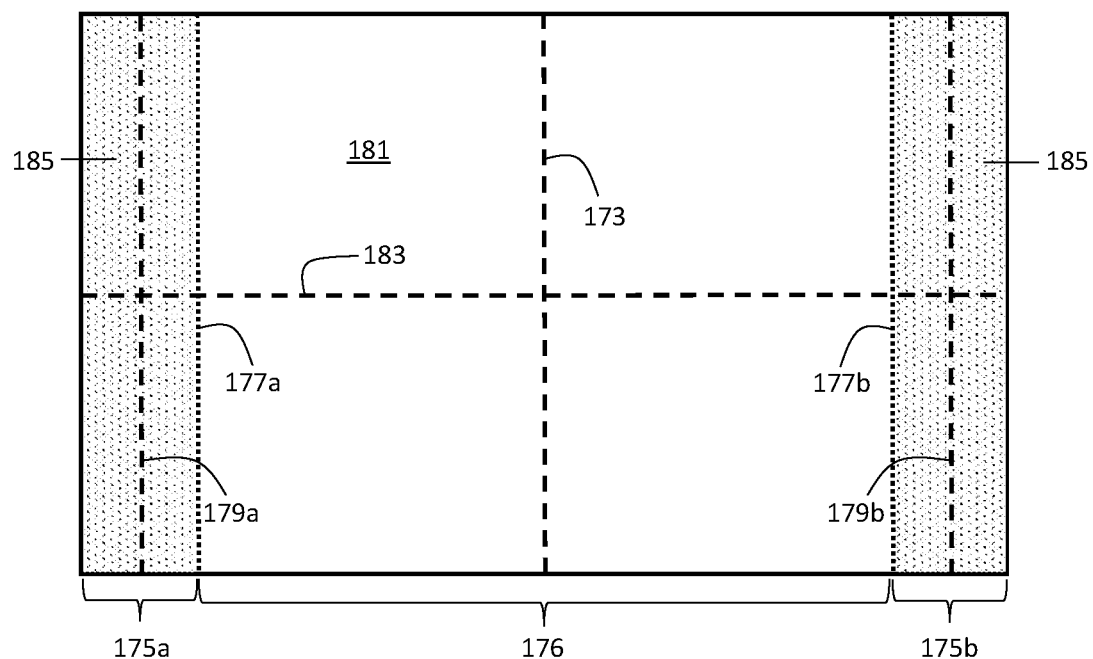
FIG. 4A-D illustrate exemplary glass ribbons comprising a polymer coating.
Figure 4B:
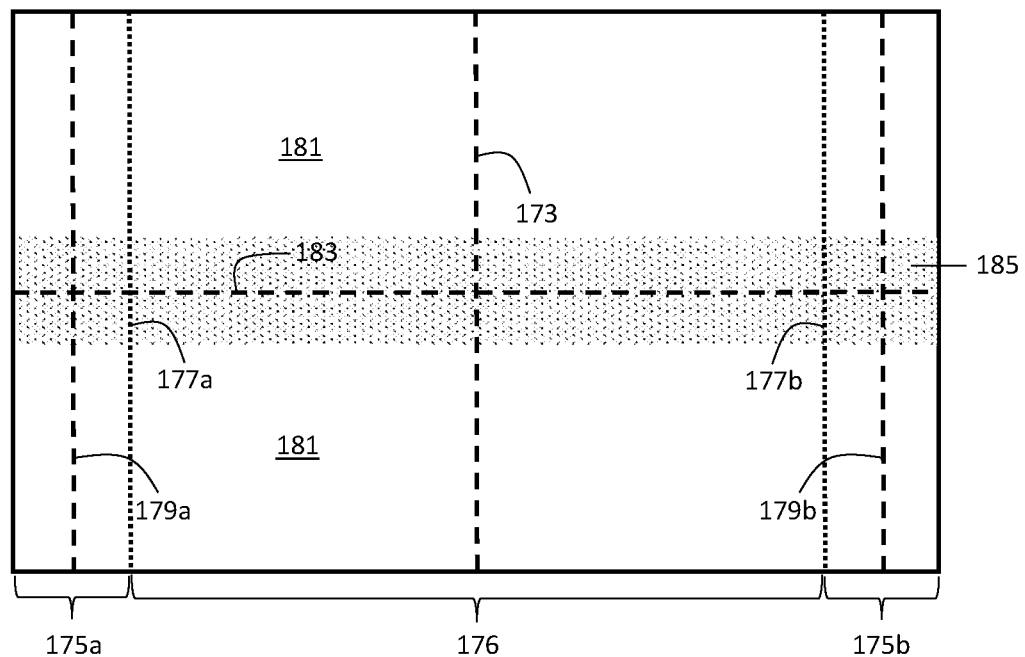
Figure 4C:
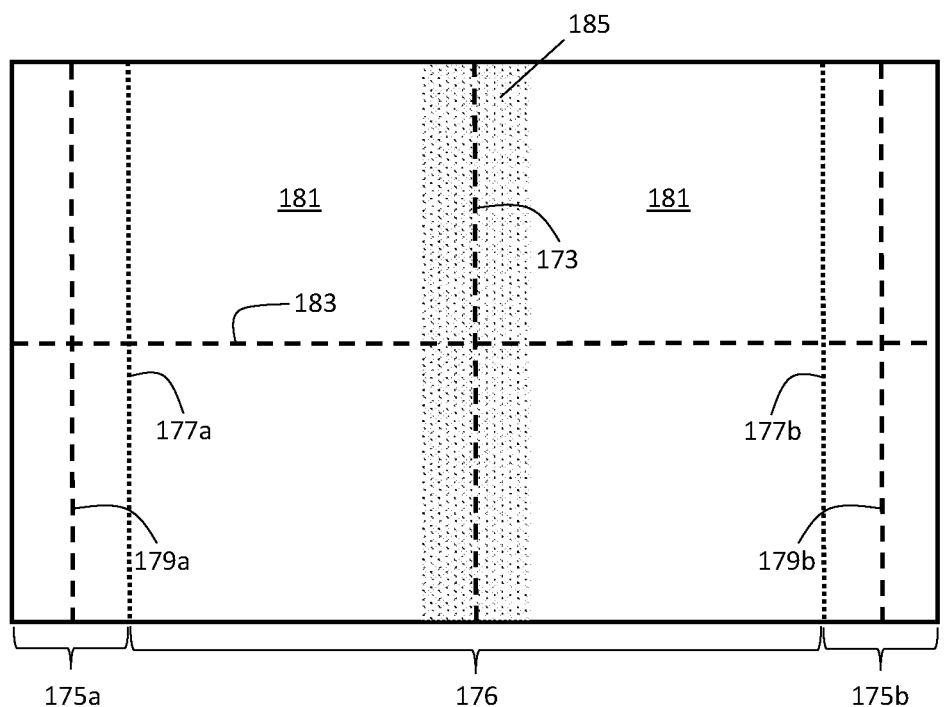
Figure 4D:
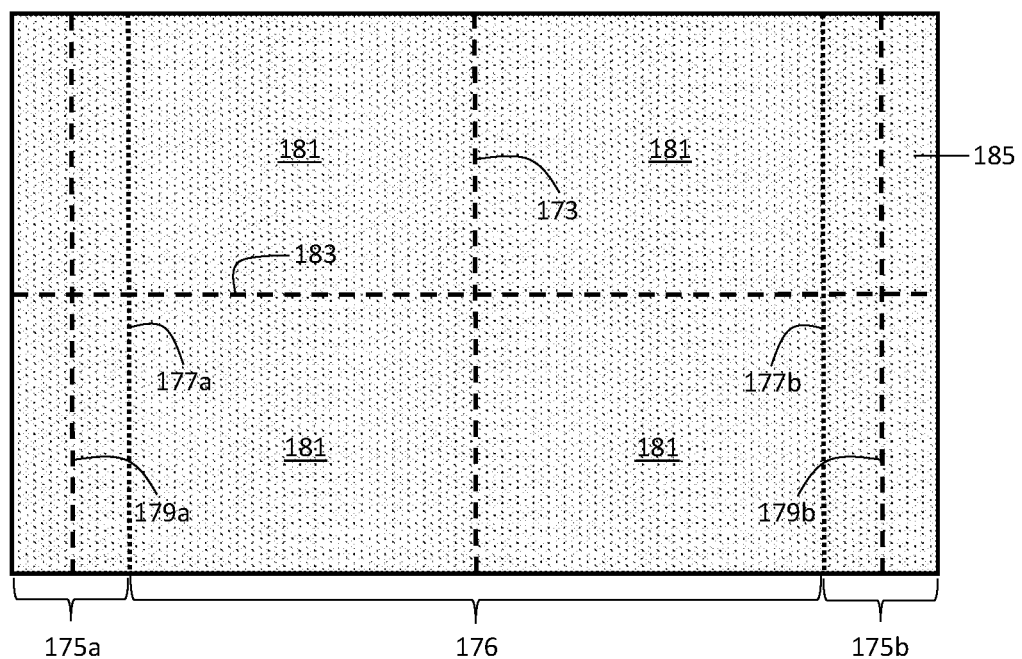

Referring to FIGS. 4A-D, the glass ribbons disclosed herein can comprise a polymer coating 185 disposed on at least a portion of at least one of the first or the second major surfaces of the glass ribbon 111. In some embodiments, the polymer coating can be present on both the first and second major surfaces or portions thereof. As depicted in FIG. 4A, the polymer coating 185 can be present on both bead regions 175a, 175b of one or both of the major surfaces. The glass ribbon may then be vertically separated, e.g., along one or both of lines 177a, 177b to remove the bead region(s) to provide glass sheet 181. Alternatively, as depicted in FIGS. 4B-C, the polymer coating 185 may be present on a portion of the ribbon 111 corresponding to a horizontal and/or vertical score line on one or both of the major surfaces. In various embodiments, the at least one score line (e.g., horizontal and/or vertical) may be positioned in a region of the glass ribbon coated with the polymer coating or proximate thereto, e.g., the polymer coating can partially or fully encompass the region in which the glass ribbon is scored. In other embodiments, the polymer coating may be positioned in region(s) adjacent to the score line(s). For instance, referring to FIG. 4B, the glass ribbon 111 can be separated along horizontal score line 183 into glass sheets 181. The polymer coating 185 can thus be present on a portion of the ribbon corresponding to the horizontal score line 183 on one or both of the major surfaces. Similarly, referring to FIG. 4C, the glass ribbon 111 can be separated along vertical center line 173 into glass sheets 181. In such embodiments, the polymer coating 185 can be present on a portion of the ribbon corresponding to the vertical center line 173 on one or both of the major surfaces. Combinations of the embodiments depicted in FIGS. 4A-C are also contemplated, including, e.g., coating the bead regions as depicted in FIG. 4A and coating a horizontal score line as depicted in FIG. 4B, coating a horizontal score line as depicted in FIG. 4B and a vertical score line as depicted in FIG. 4C, and so forth without limitation. In further embodiments, the polymer coating 185 can be present on substantially all of one or both of the major surfaces of the glass ribbon, e.g., as shown in FIG. 4D.

In certain embodiments, the polymer coating 185 can be present on only the bead region(s) 175a, 175b and such regions can be separated from the glass ribbon 111, such that an additional step to remove the polymer coating 185 from the resulting glass sheet 181 is not necessary. However, in other embodiments, the polymer coating 185 can be present on one or more portions of the central region of the glass ribbon 111 and can subsequently be removed after the separation process if desired. Removal techniques can include, but are not limited to, scraping, peeling, dissolving, etching, and other like processes. In additional embodiments, a non-quality portion of the glass sheet (comprising residual polymer coating) may be separated from a quality portion of the glass sheet (not comprising the polymer coating), e.g., by laser cutting, mechanical scoring and breaking, and other like separation processes. Of course, it is to be understood that the polymer coatings 185 illustrated in FIGS. 4A-D are exemplary only and other regions of the glass ribbon 111 can be coated with the polymer coating 185 in any pattern suitable for a desired separation process. For instance, the horizontal and/or vertical score lines may be placed in any desired location and the location of the polymeric coating may be correspondingly adjusted. Additionally, the score lines may be other than vertical or horizontal, such as diagonal or orthogonal. The score lines may also be non-linear, such as curvilinear or including one or more curvilinear segments.

According to various embodiments, the polymer coating 185 on at least a portion of the first and/or second major surface can have a thickness of about 50 microns (μm) or less, such as ranging from about 0.01 μm to about 40 μm, from about 0.05 μm to about 30 μm, from about 0.1 μm to about 20 μm, from about 0.5 μm to about 10 μm, from about 1 μm to about 5 μm, or from about 2 μm to about 3 μm, including all ranges and subranges therebetween. In certain embodiments, the polymer coating 185 may not have a uniform thickness across the area of application and, in such embodiments, the thickness of the coating can correspond to an average thickness across the coated area. In other embodiments, the polymer coating 185 can be formed by multiple applications of polymer sub-coatings and, in such embodiments, the thickness of the coating can correspond to an aggregate thickness of all sub-coatings.

Exemplary compositions suitable for use as the polymer coating can include polymers that are thermally stable at temperatures equal to or greater than 300° C., such as ranging from about 300° C. to about 600° C., from about 325° C. to about 550° C., from about 350° C. to about 500° C., or from about 400° C. to about 450° C., including all ranges and subranges therebetween. As used herein, the term "thermally stable" and variations thereof is intended to denote that the onset point of thermal degradation of the composition, as indicated by the beginning of weight loss, is above the specified temperature (see FIG. 6). By way of non-limiting example, suitable polymer compositions can be chosen from polyimides, polyamides, polysulfones, polybenzimidazoles, silicones, epoxies, acrylates, and any other polymers that are thermally stable at temperatures equal to or greater than about 300° C. In some embodiments, the polymer composition may be a thermoplastic polymer. In additional embodiments, the polymer composition may be a thermally curable polymer, e.g., undergoing a crosslinking reaction at elevated temperatures, such as at temperatures equal to or greater than about 300° C.

For example, polyimides, such as aromatic polyimides, are thermally curable thermoplastic polymers that are thermally stable at temperatures equal to or greater than about 400° C. Aromatic polyimides may also exhibit at least one of chemical and/or mechanical robustness, high ductility, low CTE, low dielectric constant, and/or low flammability. Two exemplary aromatic polyimides, and their respective crosslinking reactions (I) and (II), are produced below for illustrative purposes. In the first reaction (I), polyamic acid (PAA) is thermally cured to produce polyimide (PI). In the second reaction (II), poly(pyromellitic dianhydride-co-4,4'-oxydianiline), amic acid (PMDA-ODA PAA) is thermally cured to form Kapton®, which is a polyimide available from DuPont that is stable across a wide range of temperatures from −269° C. to greater than 400° C.

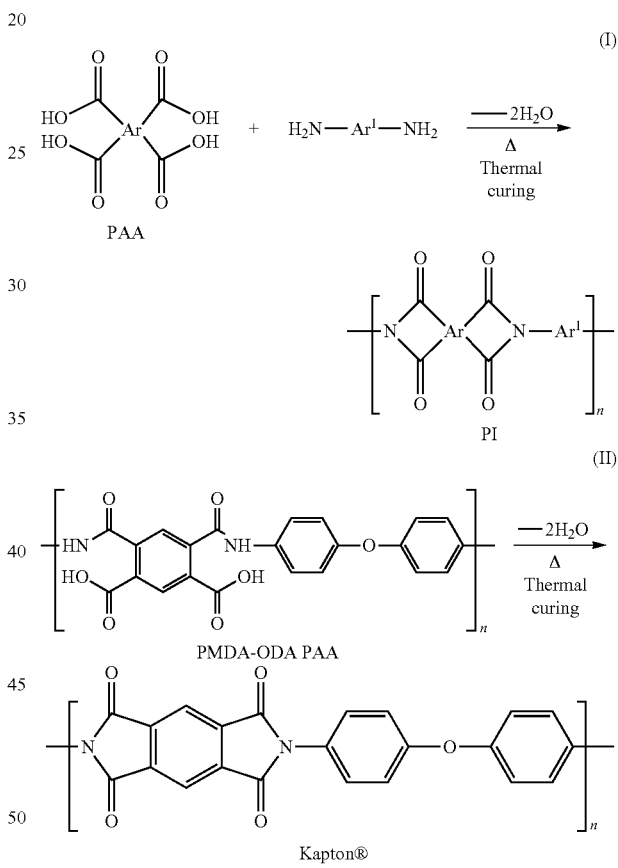

The polymer coating may be applied directly to the glass ribbon surface and may, as discussed above, be thermally stable at the surface temperature of the glass ribbon. In other embodiments, discussed in more detail below, the precursor(s) of a thermally curable polymer, such as the polyamic acid precursors depicted above, can be applied to the glass ribbon and subsequently cured in situ by contact with the hot glass ribbon surface to form the polymer coating. For example, the surface temperature of the glass ribbon may be equal to or greater than about 300° C., such as ranging from about 300° C. to about 600° C., from about 325° C. to about 550° C., from about 350° C. to about 500° C., or from about 400° C. to about 450° C., including all ranges and subranges therebetween.

The glass ribbon 111 may comprise any glass composition, including, but not limited to, soda-lime silicate, aluminosilicate, alkali-aluminosilicate, borosilicate, alkaliborosilicate, aluminoborosilicate, alkali-aluminoborosilicate, and other similar glasses. Non-limiting examples of commercially available glasses include EAGLE XG®, Willow®, Gorilla®, Lotus™, Iris™, and Jade™ glasses from Corning Incorporated, to name a few. The glass ribbon 111 produced by the methods disclosed herein can have any desired thickness, including ultra-thin glass ribbons. Exemplary ribbon thicknesses, defined as the distance between the first and second major surfaces, can range from about 0.1 mm to about 3 mm, such as from about 0.3 mm to about 2.5 mm, from about 0.5 mm to about 2 mm, from about 0.7 mm to about 1.5 mm, or from about 1 mm to about 1.1 mm, including all ranges and subranges therebetween.

Exemplary CTEs (measured over a temperature range of 25° C. to 300° C.) for the glass ribbons disclosed herein can range, for example, from about $3\times10^{-6}/°$ C. to about $11\times10^{-6}/°$ C., such as from about $4\times10^{-6}/°$ C. to about $10\times10^{-6}/°$ C., from about $5\times10^{-6}/°$ C. to about $8\times10^{-6}/°$ C., or from about $6\times10^{-6}/°$ C. to about $7\times10^{-6}/°$ C., including all ranges and subranges therebetween. Exemplary CTEs (measured over a temperature range of about 25-300° C.) for the polymeric coating may range from about $10\times10^{-6}/°$ C. to about $80\times10^{-6}/°$ C., such as from about $15\times10^{-6}/°$ C. to about $60\times10^{-6}/°$ C., or from about $20\times10^{-6}/°$ C. to about $40\times10^{-6}/°$ C., including all ranges and subranges therebetween. In certain embodiments, the polymeric coating may be chosen to have a CTE similar to that of the glass ribbon, e.g., within an order of magnitude of the glass ribbon CTE. In other embodiments, the CTE of the polymeric coating may be up to about 5 times greater than the glass ribbon CTE, such as 1.5 times greater, 2 times greater, 3 times greater, or 4 times greater, including all ranges and subranges therebetween.

Glass ribbons comprising a polymer coating on at least a portion of one or more major surfaces as disclosed herein may exhibit a higher fracture toughness as compared to uncoated glass ribbons. For instance, the fracture toughness of a coated glass ribbon may be at least 10% higher than an uncoated glass ribbon having the same glass composition, thickness, etc. In some embodiments, the improvement in fracture toughness as compared to an uncoated glass ribbon can be as high as 300%, e.g., ranging from about 10% to about 300%, from about 20% to about 250%, from about 30% to about 200%, from about 40% to about 150%, from about 50% to about 100%, from about 60% to about 90%, or from about 70% to about 80%, including all ranges and subranges therebetween. Exemplary coated glass ribbons may have a fracture toughness, as measured at room temperature, ranging from about 0.5 MPa*$m^{0.5}$ to about 2 MPa*$m^{0.5}$, such as from about 0.6 MPa*$m^{0.5}$ to about 1.8 MPa*$m^{0.5}$, from about 0.7 MPa*$m^{0.5}$ to about 1.6 MPa*$m^{0.5}$, from about 0.8 MPa*$m^{0.5}$ to about 1.5 MPa*$m^{0.5}$, from about 0.9 MPa*$m^{0.5}$ to about 1.2 MPa*$m^{0.5}$, or from about 1 MPa*$m^{0.5}$ to about 1.1 MPa*$m^{0.5}$ including all ranges and subranges therebetween. Fracture toughness values reported herein were measured using the protocol set forth in Example 4 below.

Also disclosed herein are methods for forming a glass sheet, the methods comprising melting glass batch materials to form molten glass; processing the molten glass to form a glass ribbon having a first major surface and a second major surface; applying a polymer precursor to at least a portion of at least one of the first major surface or the second major surface, the portion having a surface temperature equal to or greater than 300° C.; curing the polymer precursor to form a polymer coating; and separating the glass ribbon to produce at least one glass sheet, wherein the polymer precursor is curable within a time period of less than about 10 seconds at a curing temperature ranging from about 300° C. to about 600° C. Glass sheets produced by these methods are also disclosed herein.

The term "batch materials" and variations thereof is used herein to denote a mixture of glass precursor components which, upon melting, react and/or combine to form a glass. The glass batch materials may be prepared and/or mixed by any known method for combining glass precursor materials. For example, in certain non-limiting embodiments, the glass batch materials can comprise a dry or substantially dry mixture of glass precursor particles, e.g., without any solvent or liquid. In other embodiments, the glass batch materials may be in the form of a slurry, for example, a mixture of glass precursor particles in the presence of a liquid or solvent.

According to various embodiments, the batch materials may comprise glass precursor materials, such as silica, alumina, and various additional oxides, such as boron, magnesium, calcium, sodium, strontium, tin, or titanium oxides. For instance, the glass batch materials may comprise a mixture of silica and/or alumina with one or more additional oxides. In various embodiments, the glass batch materials can comprise from about 45 wt % to about 95 wt % collectively of alumina and/or silica and from about 5 wt % to about 55 wt % collectively of at least one additional oxide, such as boron, magnesium, calcium, sodium, strontium, tin, and/or titanium, to name a few. The resulting glass composition may, in certain embodiments, have a liquidus viscosity equal to or less than about 100,000 poise, such as equal to or less than about 80,000 poise, equal to or less than about 60,000 poise, equal to or less than about 50,000 poise, equal to or less than about 40,000 poise, equal to or less than about 30,000 poise, equal to or less than about 20,000 poise, or even lower, such as ranging from about 20,000 to about 100,000 poise. In other embodiments, the liquidus viscosity of the glass composition may be equal to or greater than 100,000 poise.

The batch materials can be melted according to any method known in the art, including the methods discussed herein with reference to FIG. 2. For example, the batch materials can be added to a melting vessel and heated to a temperature ranging from about 1000° C. to about 1800° C. The batch materials may, in certain embodiments, have a residence time in the melting vessel ranging from several minutes to several hours, depending on various variables, such as the operating temperature and the batch size. For example, the residence time may range from about 30 minutes to about 12 hours. The molten glass can subsequently undergo various additional processing steps, including fining to remove bubbles, and stirring to homogenize the glass melt, to name a few. The molten glass can then be processed to produce a glass ribbon according to any method known in the art, including the fusion draw methods discussed herein with reference to FIGS. 1-2, as well as slot-draw, rolling, and float methods.

In a fusion draw glass manufacturing system, e.g., the system shown in FIG. 2, the FDM 230 can be divided into two sections, including a top section in which the molten glass and/or glass ribbon is exposed to controlled (e.g., elevated) temperatures, and a bottom section in which the glass ribbon is exposed to ambient temperatures. In the bottom section, also referred to as the bottom-of-draw (BOD), the glass ribbon 111 is allowed to cool, e.g., through free convection and radiation, prior to scoring and separating the ribbon into glass sheets. In various embodiments, the BOD may also have a controlled temperature, e.g., cooler than ambient temperatures. According to certain embodiments, the polymer precursor can be applied and cured in the BOD region of the FDM, after formation of the glass ribbon but before scoring and/or separation. Of course, in glass manufacturing systems that do not include a FDM, the polymer precursor may similarly be applied after formation of the glass ribbon but before scoring and/or separation.

The polymer precursor may be applied to the glass ribbon when the ribbon surface is at an elevated temperature, e.g., above ambient temperature. For instance, the glass ribbon surface temperature may be equal to or greater than about 300° C., such as ranging from about 300° C. to about 600° C., as discussed above. The polymer precursor may be applied, in some embodiments, as a solution comprising at least one solvent and at least one polymer precursor dispersed or dissolved in the solvent. Exemplary solvents can include, but are not limited to, aqueous solvents, alcohols, organic solvents, and mixtures thereof, such as water, deionized water, methanol, 1-methyl-2-pyrrolidinone (NMP), and other like solvents. According to various embodiments a concentration of the polymer precursor in the solution can range from about 0.1 wt % to about 20 wt %, such as from about 0.5 wt % to about 15 wt %, from about 1 wt % to about 10 wt %, from about 2 wt % to about 9 wt %, from about 3 wt % to about 8 wt %, from about 4 wt % to about 7 wt %, or from about 5 wt % to about 6 wt %, including all ranges and subranges therebetween.

The polymer precursor can be applied to the desired portion of the glass ribbon using any suitable method including, but not limited to, spray coating, such as air brushing, and slot die coating. In some embodiments, one or more nozzles can be installed in the BOD region, either together in a single location or in sequence in multiple locations. The nozzle pressure and/or treatment time can vary depending on various processing parameters, such as the viscosity and/or concentration of the solution, as well as the desired coating thickness. In some embodiments, the nozzle pressure can range from about 1 psi to about 50 psi, such as from about 5 psi to about 40 psi, from about 10 psi to about 30 psi, or from about 15 psi to about 20 psi, including all ranges and subranges therebetween. The treatment time, e.g., the time period during which the polymer precursor is sprayed onto the glass ribbon surface, can range from about 1 second to about 1 minute, such as from about 5 seconds to about 50 seconds, from about 10 seconds to about 45 seconds, from about 15 seconds to about 40 seconds, from about 20 seconds to about 35 seconds, or from about 25 seconds to about 30 seconds, including all ranges and subranges therebetween.

As noted above, a polymer precursor solution can, in some embodiments, comprise one or more polymer precursors that can be thermally cured to produce the desired polymer coating. In such embodiments, thermal curing may be carried out in situ, e.g., heat from the glass ribbon surface may be sufficient for thermal curing of the polymer precursor. The curing time and temperature can vary depending on the polymer composition. In some embodiments, the curing time can range from about 1 second to about 5 minutes, such as from about 2 seconds to about 4 minutes, from about 3 seconds to about 3 minutes, from about 4 seconds to about 2 minutes, from about 5 seconds to about 1 minute, from about 6 seconds to about 30 seconds, from about 7 seconds to about 20 seconds, from about 8 seconds to about 15 seconds, or from about 9 seconds to about 10 seconds, including all ranges and subranges therebetween. The curing temperature can range, in certain embodiments, from about 300° C. to about 600° C., such as from about 325° C. to about 550° C., from about 350° C. to about 500° C., or from about 400° C. to about 450° C., including all ranges and subranges therebetween. The curing time may also decrease as the curing temperature increases.

According to various embodiments, the polymer precursor may be curable within a time period of less than about 10 seconds at a curing temperature ranging from about 300° C. to about 600° C. In other embodiments, the polymer precursor may be curable within a time period ranging from about 3 seconds to about 6 seconds at a curing temperature ranging from about 300° C. to about 450° C. Of course, other combinations of curing times and temperatures are also envisioned, including any sub-combinations of the curing times and temperatures specified above. As used herein, the term "curable" is intended to denote that the polymer precursor is at least about 90% crosslinked within the specified time period at the specified temperature range, such as at least about 95% crosslinked, at least about 98% crosslinked, at least about 99% crosslinked, or 100% crosslinked. Without wishing to be bound by theory, and as discussed in more detail below, it is believed that faster curing times, e.g., less than 10 seconds, at the specified curing temperature, e.g., from about 300° C. to about 600° C., may result in improved fracture toughness of the glass ribbon due to the ability of the polymer precursor to achieve a greater degree of crosslinking.

As the glass ribbon cools, e.g., in the BOD region of the FDM, the polymer coating may likewise cool to produce the final polymer coating. In some embodiments, such as in the case of thermoplastic polymer coatings, the polymer coating may cool from a pliable, amorphous coating at elevated temperatures to a solidified, partially or fully crystallized coating at lower temperatures. After cooling to a desired temperature, such as room temperature, the coated glass ribbon may be transported, e.g., using a pull roll assembly 236 as illustrated in FIG. 2, for subsequent treatment, such as scoring and/or separating steps to produce one or more glass sheets. Various scoring and/or separation techniques and apparatuses are discussed above including, but not limited to, a TAM for horizontally scoring and separating the glass ribbon, a VBS for vertically scoring and separating the glass ribbon, or other similar devices. The glass sheets produced by these methods are also disclosed herein.

The methods and glass ribbons disclosed herein may provide one or more advantages over prior art methods and ribbons without a polymer coating. In certain embodiments, the methods disclosed herein can be advantageously used to produce thin glass ribbons (e.g., Corning® Willow® Glass) and/or high CTE glass ribbons (e.g., Corning® Gorilla® Glass) with reduced cracking during the separation process. Moreover, the methods disclosed herein can also be used to produce glass ribbons from any glass composition at high flow rates to increase output and/or in laminate processes to produce multi-layer glass ribbons with reduced cracking during the separation process.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a component" includes examples having two or more such components unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method that comprises A+B+C include embodiments where a method consists of A+B+C and embodiments where a method consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The following Examples are intended to be non-restrictive and illustrative only, with the scope of the disclosure being defined by the claims.

Examples

Example 1: Coating Solution Preparation

Polymer precursor solutions were prepared by diluting a PMDA-ODA PAA stock solution from Sigma Aldrich (15 wt % in 1-methyl-2-pyrrolidone (NMP)) to produce 0.1 wt %, 1.0 wt %, and 7.5 wt % solutions. The 0.1 wt % solution was prepared by adding 0.50 g of the PMDA-ODA PAA stock solution to 74.50 g of anhydrous NMP. The 1.0 wt % solution was prepared by adding 5.00 g of the PMDA-ODA PAA stock solution to 70.00 g of anhydrous NMP. The 7.5 wt % solution was prepared by adding 40.00 g of the PMDA-ODA PAA stock solution to 40.00 g of anhydrous NMP. The resulting mixtures were vortexed and then stirred for 4 hours to form homogeneous solutions.

Precursor solutions with an adhesion promoter were prepared by combining (3-aminopropyl) trimethoxysilane (APTES) with PMDA-ODA PAA and anhydrous NMP. A solution comprising a weight ratio of APTES to PMDA-ODA PAA of 0.1/99.9 was prepared by adding 0.0751 g of APTES to 5.00 g of the PMDA-ODA PAA stock solution and 70.00 g of anhydrous NMP. A solution comprising a weight ratio of APTES to PMDA-ODA PAA of 1/99 was prepared by adding 0.7576 g of APTES to 5.00 g of the PMDA-ODA PAA stock solution and 70.00 g of anhydrous NMP. The resulting mixtures were vortexed and then stirred for 4 hours to form homogeneous solutions.

Example 2: Coating Solution Application

Figure 5A:
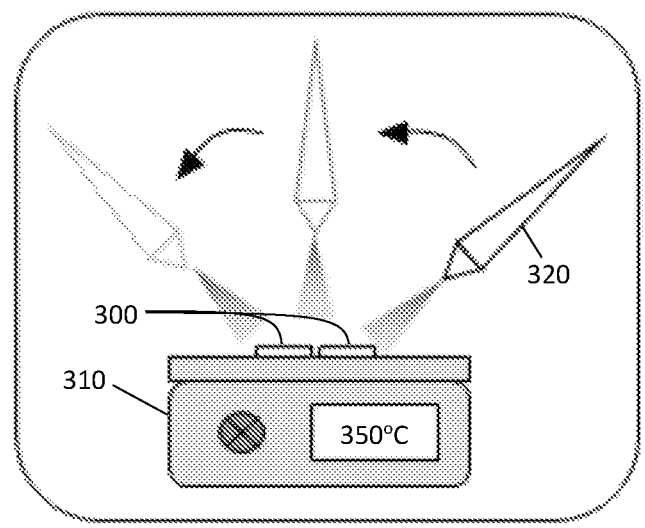
FIGS. 5A-B illustrate experimental set-ups for application of a polymer coating to a glass sample.
Figure 5B:
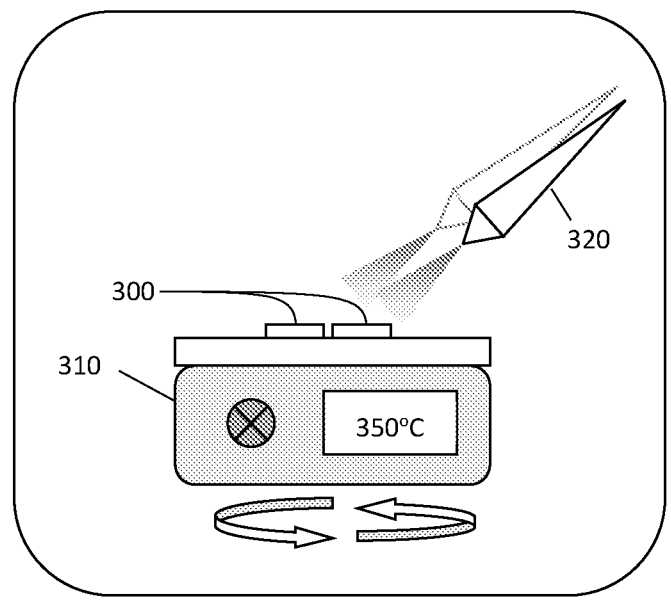

To simulate application of a polymer coating to hot glass ribbons, glass samples were placed on a hotplate and heated to temperatures ranging from 300-400° C.±10° C. as measured by a handheld infrared thermometer. Once the glass samples reached the desired temperature, a major surface of the samples was coated with the precursor solutions using a single airbrush operating at 15-30 psi or more, depending on the viscosity of the solution. The solution was applied in multiple short bursts of ~1 second from multiple random angles at a distance ranging from 4-6" from the surface for a time period of 5 seconds to 30 seconds. The experimental set-up is illustrated in FIG. 5A, in which the glass samples 300 are placed on the hotplate 310 and sprayed with a single airbrush 320 that articulates at various angles with respect to the glass sample 300, as indicated by the arrows. Increased delivery rate can be achieved by adding a second airbrush and improved coating uniformity can be achieved by applying an orbital motion to the hotplate, as illustrated in the experimental set-up of FIG. 5B. After coating, the glass samples were left on the hotplate for a time period of 5 seconds to 10 minutes to thermally cure the coating in situ. The glass samples were then removed from the hotplate and cooled to room temperature. The coating thickness, as measured by a Bruker DektakXT® stylus profiler, varied from 0.1 μm to 50 μm depending on the coating process and conditions.

Example 3: Coating Thermal Stability

Figure 6:
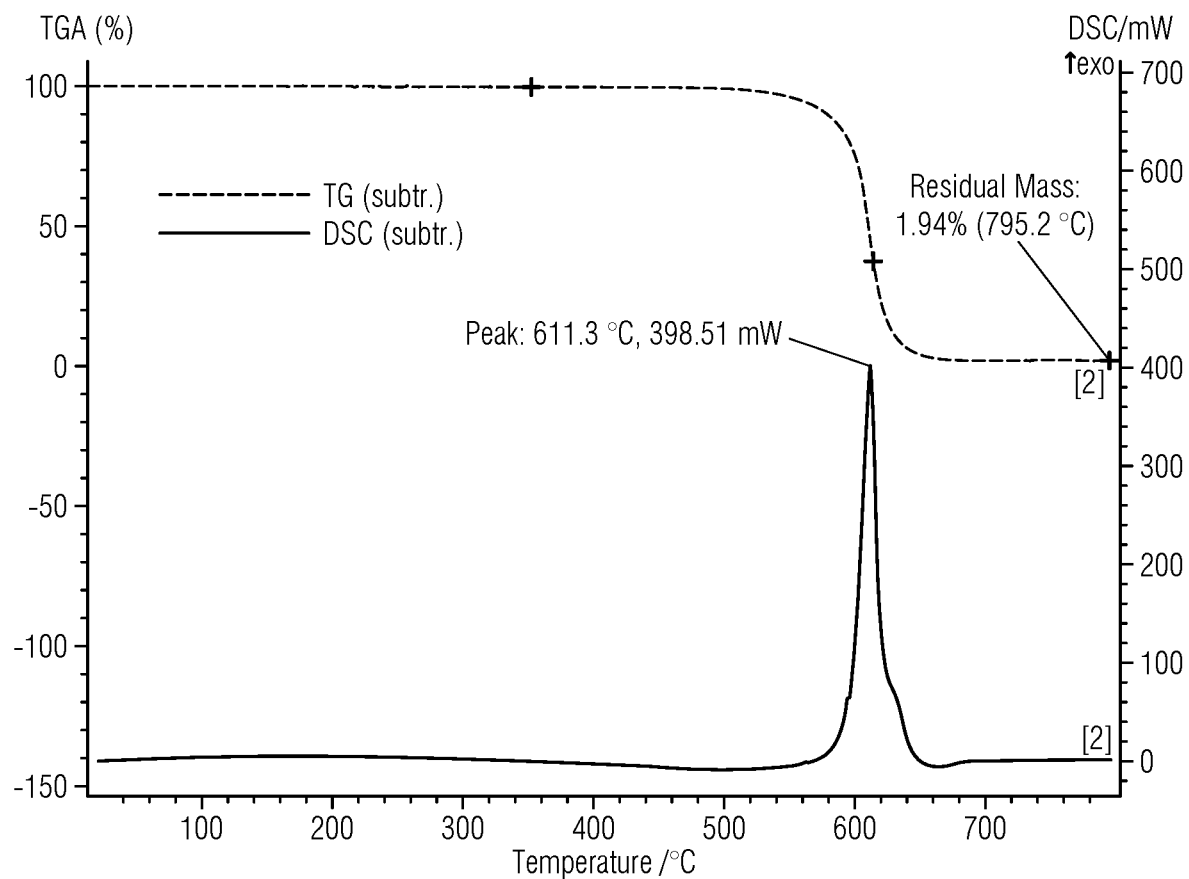
FIG. 6 is a differential scanning calorimetry thermal profile of an exemplary polymer coating.

A 1 wt % PMDA-ODA PAA solution without an adhesion promoter was applied to a glass sample and cured to produce a PMDA-ODA PI coating. Differential scanning calorimetry (DSC) and thermogravimetric (TGA) analysis data (in air) for the coating is shown in FIG. 6 and indicates that the coating is thermally stable at temperatures greater than 400° C., with an initial weight loss beginning at about 505° C. and a peak decomposition temperature of about 611° C. by DSC.

Example 4: Fracture Toughness Testing

The toughening effect of the coating on the glass sheet was evaluated using the double-torsion (DT) standard method for measuring fracture toughness. Fracture toughness is a measure of a material's resistance to crack propagation. The DT configuration comprises a symmetric four-point loading around a notch on one end of a rectangular plate, which produces torsional deformation in the two plate halves, driving the formation of a crack originating from the tip of the notch. The stress intensity factor obtained using this method is independent of crack length in the test specimen. The DT method can be used to test the fracture toughness of thin glass plates such as display glass. The DT method can also be used to evaluate slow crack growth behavior of the material.

Each coated or uncoated sample was prepared by pre-cracking the sample with an initial crack length of about 35% to about 65% of the sample length. The pre-cracked sample was then positioned in a loading fixture and placed in a furnace box. The glass sample was allowed to sit in the furnace until reaching thermal equilibrium at the desired temperature. A motor was then triggered to push the loading rod down at a given rate. A load vs. time curve was recorded and the peak load was extracted to calculate the fracture toughness value using Equation (I):

$$K_I = PW_m \sqrt{\frac{3(1+\nu)}{Wt^4\varphi}},$$

where P is peak load (N); $W_m$ is the distance from the loading point to the support point (mm); $\nu$ is the Poisson ratio; W is the specimen width (mm); t is the specimen thickness (mm); and $\varphi$ is the thickness correction factor.

Example 5: Coating Thickness

Corning® Gorilla® Glass (code 5318) samples were coated with 7.5 wt %, 1 wt %, and 0.1 wt % PMDA-ODA PAA solutions and cured as set forth in Examples 1 and 2. For each solution, 5 glass samples (20 mm×40 mm) were heated to 350° C. and coated on both sides, one at a time, using a single airbrush as shown in FIG. 5A. The coating conditions are provided in Table I below. A higher airbrush pressure was used for the 7.5 wt % solution (A) due to its higher viscosity.

TABLE I

| Coating Conditions | | | |
|---|---|---|---|
| | A | B | C |
| Concentration | 7.5 wt % | 1.0 wt % | 0.1 wt % |
| Spray Time | 15 sec | 15 sec | 15 sec |
| Spray Pressure | 25-30 psi | 15 psi | 15 psi |
| Curing Temperature | 350° C. | 350° C. | 350° C. |
| Curing Time | 30 min | 30 min | 30 min |

Figure 7:
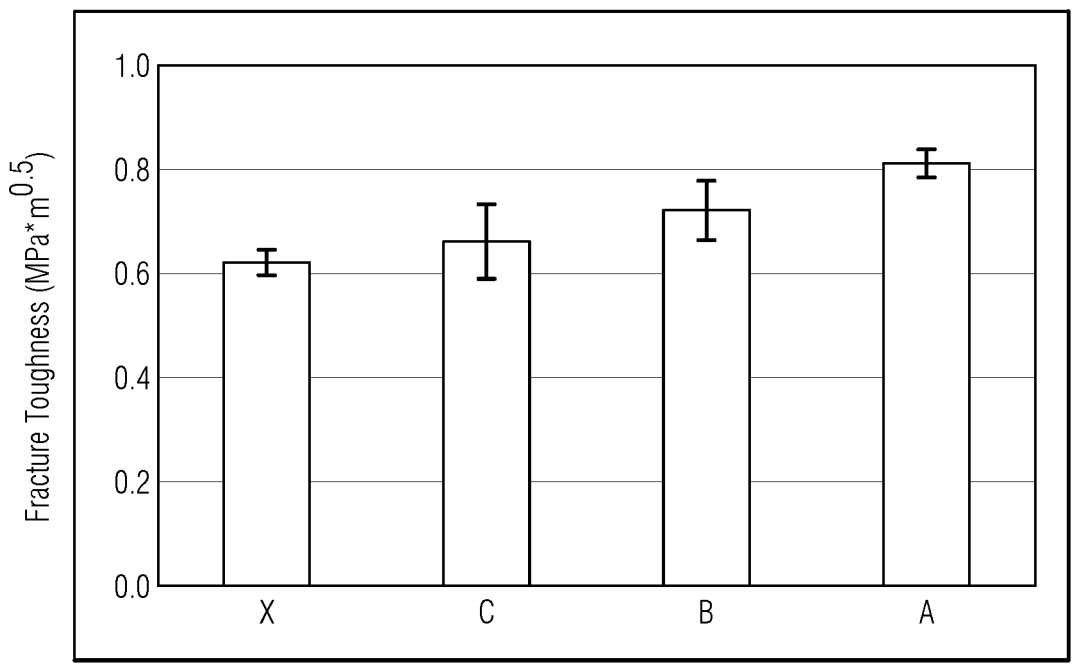
FIG. 7 is a bar chart of fracture toughness for uncoated and coated glass samples.

A DT test was performed at room temperature on all three sets of coated samples, as well as uncoated control samples. The results of this testing are depicted in FIG. 7. Inventive samples A (7.5 wt %) showed an average effective fracture toughness of 0.81 MPa*m$^{0.5}$, a 31.6% increase as compared to the uncoated control set X. Improvements were also observed for inventive samples B (1 wt %) and inventive samples C (0.1 wt %), which exhibited 16.8% and 6.9% improvement, respectively, as compared to the uncoated control samples X. Fracture toughness was observed to increase with increasing solution concentration. Variation in fracture toughness was also observed to decrease from sample to sample for higher solution concentrations.

Figure 8A:
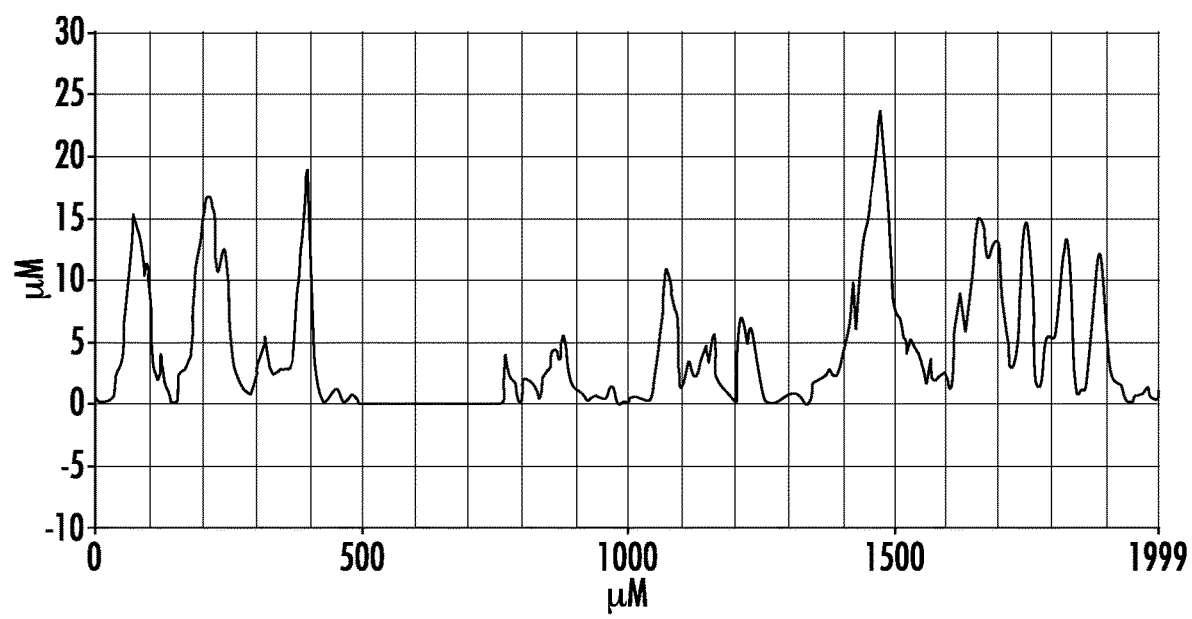
FIGS. 8A-C are profilometer thickness profiles for exemplary polymer coatings.
Figure 8B:
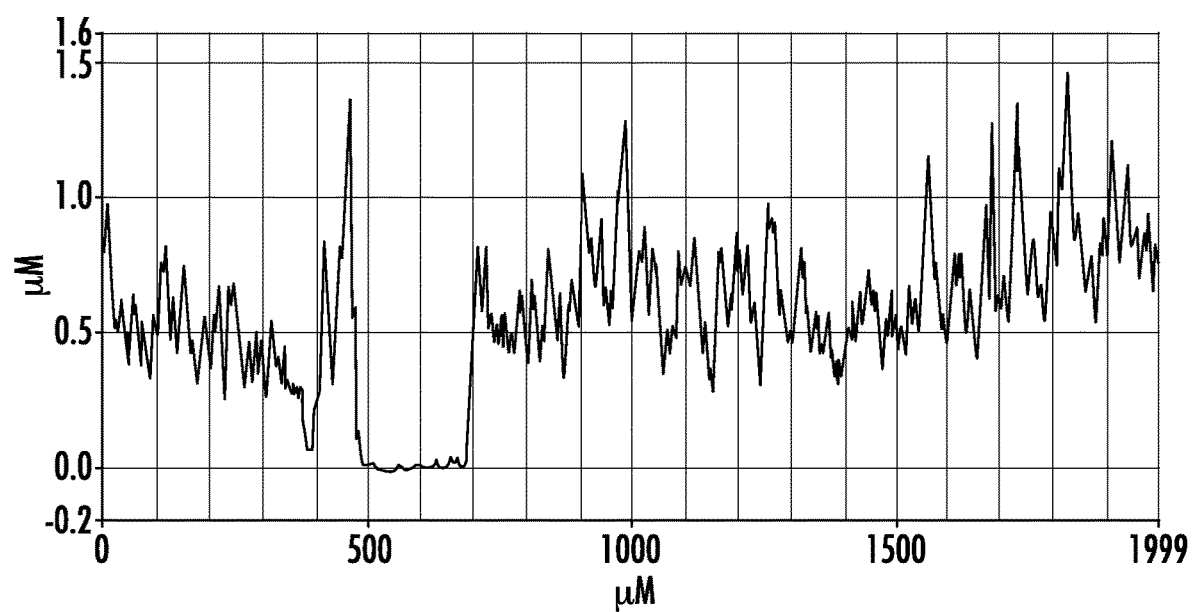
Figure 8C:
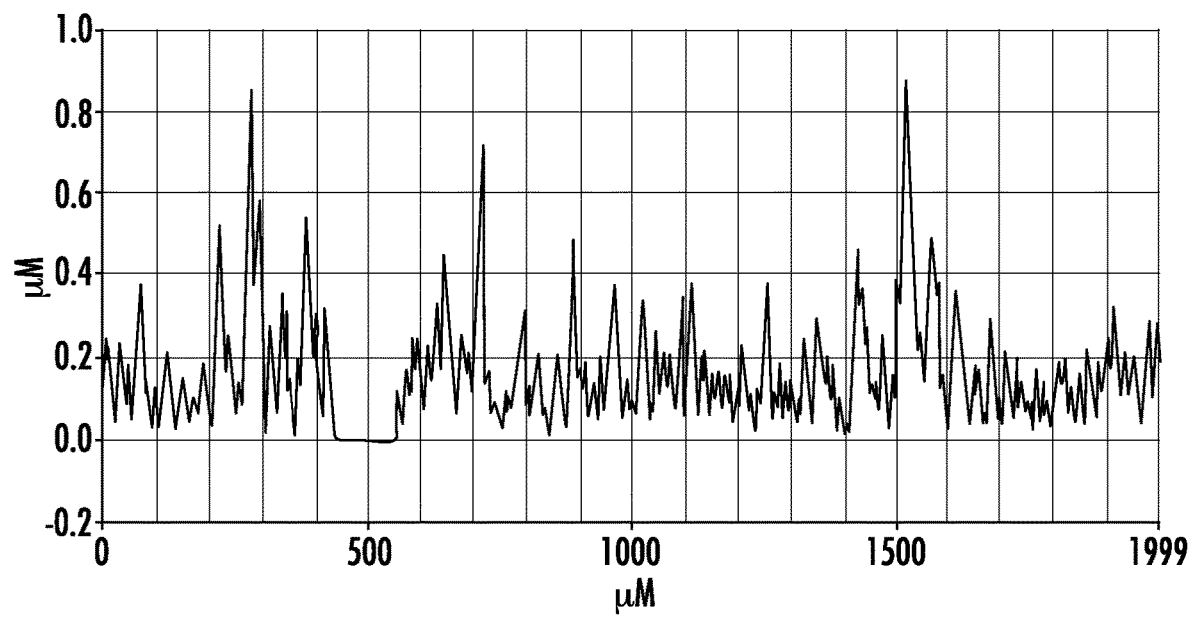

A profilometer was used to measure coating thickness for two samples from each set of samples A-C. The results of this testing are presented in Table II below. Coating thickness was observed to increase with increasing solution concentration. FIGS. 8A-C show the profilometer thickness profiles for one sample from each set of coated samples A-C, respectively. It can be seen from these profiles that the coating varied greatly along the sample length. For instance, the thickness for sample B (FIG. 8B) ranged from about 0.3 μm to about 1.5 μm. It is believed the coating variation is due to solvent evaporation and surface tension increase when the sprayed droplets touch the hot glass surface. Coating thickness variation can be reduced by changing the coating procedure and/or conditions, such as nozzle design and/or number. For example, using multiple airbrushes, e.g., as illustrated in the experimental set-up of FIG. 5B, may provide a more uniform coating. It is believed that improved coating uniformity may also further improve the fracture toughness of the coated sample.

TABLE II

| Coating Properties | | | | |
|---|---|---|---|---|
| | X | A | B | C |
| Concentration (wt %) | — | 7.5 | 1.0 | 0.1 |
| Fracture Toughness (MPa * m$^{0.5}$) | 0.62 | 0.81 | 0.72 | 0.66 |
| Coating Thickness (μm) | 0 | 0.3-20 | 0.3-1.5 | 0.3-0.8 |

Example 6: Adhesion Promoter

Corning® Gorilla® Glass (code 5318) samples (20 mm×40 mm) were coated with the 1 wt % coating solution used in samples B of Example 5. The same 1 wt % coating solution was modified by adding an adhesion promoting agent (APTES) at a concentration of 0.1 wt % APTES (D) or 1 wt % APTES (E). The glass samples were coated and cured as set forth in Examples 1-2. For each solution, 5 glass samples (20 mm×40 mm) were heated to 350° C. and coated on both sides, one at a time, using a single airbrush as shown in FIG. 5A. The coating conditions are provided in Table III below.

TABLE III

| Coating Conditions | | | |
|---|---|---|---|
| | B | D | E |
| PMDA-ODA PAA Concentration | 1.0 wt % | 1.0 wt % | 1.0 wt % |
| APTES Concentration | 0 wt % | 0.1 wt % | 1.0 wt % |
| Spray Time | 15 sec | 15 sec | 15 sec |
| Spray Pressure | 15 psi | 15 psi | 15 psi |
| Curing Temperature | 350° C. | 350° C. | 350° C. |
| Curing Time | 30 min | 30 min | 30 min |

Figure 9:
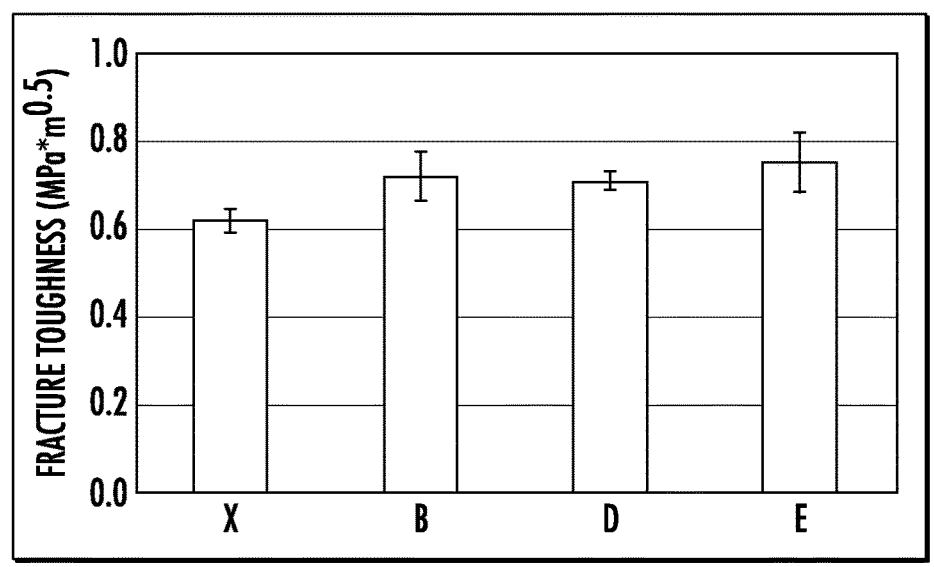
FIG. 9 is a bar chart of fracture toughness for uncoated and coated glass samples measured at room temperature.

A DT test was performed at room temperature on all three sets of coated samples B, D, and E, as well as uncoated control samples X. The results of this testing are depicted in FIG. 9. While the addition of 1 wt % APTES (E) improved the fracture toughness by 6.4% as compared to the coated samples without adhesion promoter (B), the addition of 0.1 wt % APTES (D) did not show any noticeable improvement. Measurement of coating thickness using a profilometer showed that samples B and D had similar thicknesses in the range of 0.3-1.5 μm, whereas samples E had a slightly lower thickness ranging from 0.1-1.0 μm.

Figure 10:
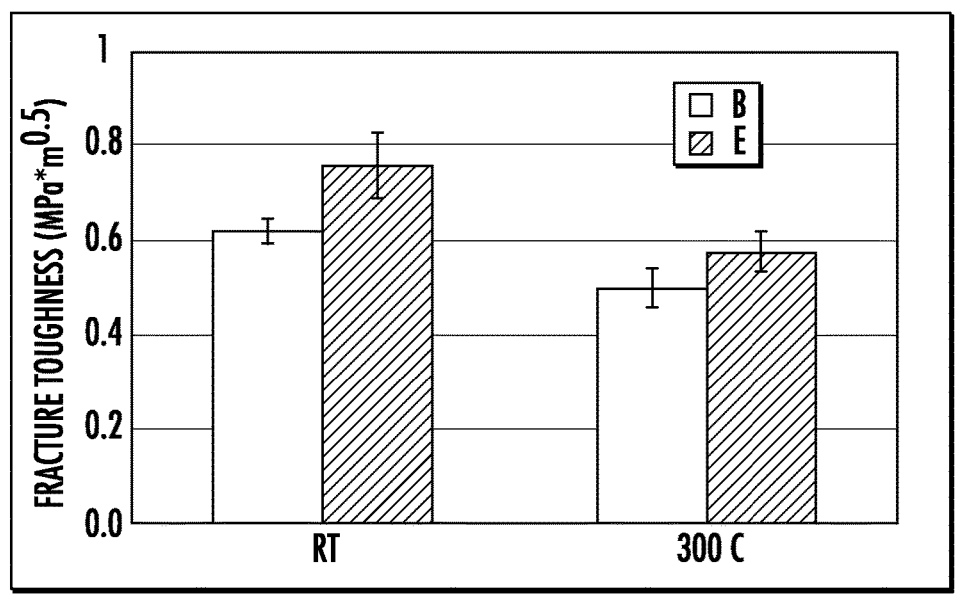
FIG. 10 is a bar chart of fracture toughness for uncoated and coated glass samples measured at room temperature and 300° C.

A DT test was performed at 300° C. on coated samples E and uncoated control samples X. The results of this testing are depicted in FIG. 10. Inventive samples E showed an average effective fracture toughness at 300° C. of 0.57 MPa*m$^{0.5}$, a 14.9% increase as compared to the control set X (0.5 MPa*m$^{0.5}$). There was a greater improvement in fracture toughness at room temperature, which increased from 0.62 MPa*m$^{0.5}$ (X) to 0.76 MPa*m$^{0.5}$ (E), a 21.8% improvement. Coating thickness as measured at 300° C. for coated samples E was 0.2-2.2 μm, similar to the samples E tested at room temperature (0.1-1.0 μm).

Example 7: Partial Coating

Two Corning® Gorilla® Glass (code 5318) samples (20 mm×40 mm) were coated with the 7.5 wt % coating solution used in samples A of Example 5. The glass samples were heated to 350° C. and coated on both sides, covering across the width and one-half of the length of the sample where a pre-crack having a length of one-third of the sample was made after coating but before the DT test. The coating was sprayed by airbrush at a pressure of 30 psi for a time period of 15 seconds, followed by curing for 10 minutes. A DT test performed at 300° C. showed that an average effective fracture toughness for the coated samples was 0.54 MPa*m$^{0.5}$, as compared to 0.50 MPa*m$^{0.5}$ for the uncoated sample, an 8.6% improvement. This result shows that coating only a portion of the glass can also improve glass fracture toughness. The thickness of the coating on both samples was evaluated using a profilometer. The first coated sample had a coating thickness ranging from 0.1-3.7 µm, whereas the second coated sample had a coating thickness ranging from 0.1-15 µm. The second coated sample, with a higher average coating thickness, also had a higher effective fracture toughness of 0.60 MPa*m$^{0.5}$, a 20% improvement as compared to the control sample.

Example 8: Pre-Cracking

Five Corning® Gorilla® Glass (code 5318) samples (20 mm×40 mm) were pre-cracked to produce a crack having a length of one-third of the sample. The pre-cracked samples were then coated with the 7.5 wt % coating solution used in samples A of Example 5 using the coating and curing conditions set forth in Example 6. A DT test performed at 300° C. showed that an average effective fracture toughness for the coated samples was 0.58 MPa*m$^{0.5}$, a 17.1% improvement over the uncoated control samples. The thickness of the coating on two samples was evaluated using a profilometer. The first coated sample had a coating thickness ranging from 0.1 µm to 12 µm, whereas the second coated sample had a coating thickness ranging from 0.1 µm to 18 µm.

Example 9: Coating/Curing Process Variation

Glass samples were prepared using higher glass surface temperatures, shorter spray times, and shorter curing times to evaluate the effect of these variations on fracture toughness. Five Corning® Gorilla® Glass (code 5318) samples (20 mm×40 mm) were coated with the 7.5 wt % coating solution used in samples A of Example 5. The glass samples were heated to 400° C. and coated on both sides using an airbrush operating at a pressure of 30 psi for a time period of 2-3 seconds, followed by curing for 5 minutes. A DT test performed at 300° C. showed that an average effective fracture toughness for the coated samples was 0.53 MPa*m$^{0.5}$, as compared to 0.50 MPa*m$^{0.5}$ for the uncoated sample, a 5.4% improvement. The thickness of the coating on two samples was evaluated using a profilometer. The first coated sample had a coating thickness ranging from 0.2 µm to 2.2 µm, whereas the second coated sample had a coating thickness ranging from 0 µm to 0.9 µm. Without wishing to be bound by theory, it is believed that the smaller improvement in fracture toughness is due to the reduced coating thickness and/or uniformity.

Example 10: Coating Thickness/Uniformity Variation

To evaluate the effect of thicker and/or more uniform coatings, a doctor blade casting process was used to provide coatings of the 7.5 wt % solution used in samples A of Example 5 on Corning® Gorilla® Glass (code 5318) samples (20 mm×40 mm). The first and second sets (6 samples each) were produced using the same casting speeds but with different gap distances between the blade and the glass sample. Samples F had a gap distance of 5 mils, whereas samples G had a gap distance of 25 mils. A larger gap distance produces a thicker coating. After drying the samples were thermally cured in an oven.

Figure 11A:
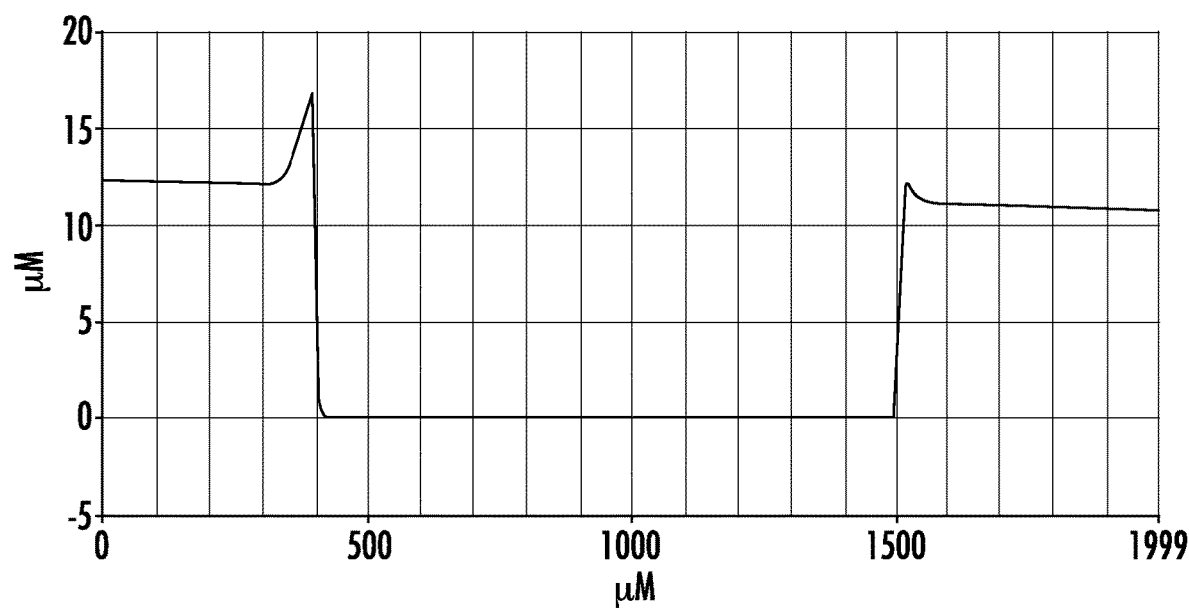
FIGS. 11A-B are profilometer thickness profiles for exemplary polymer coatings.
Figure 11B:
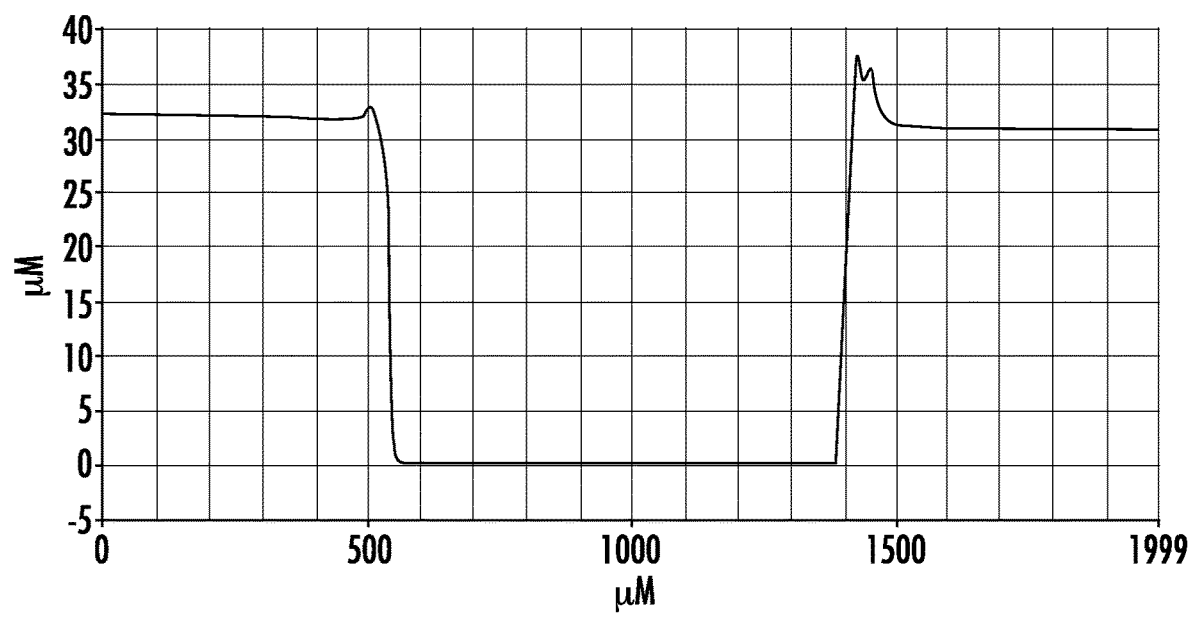
Figure 12:
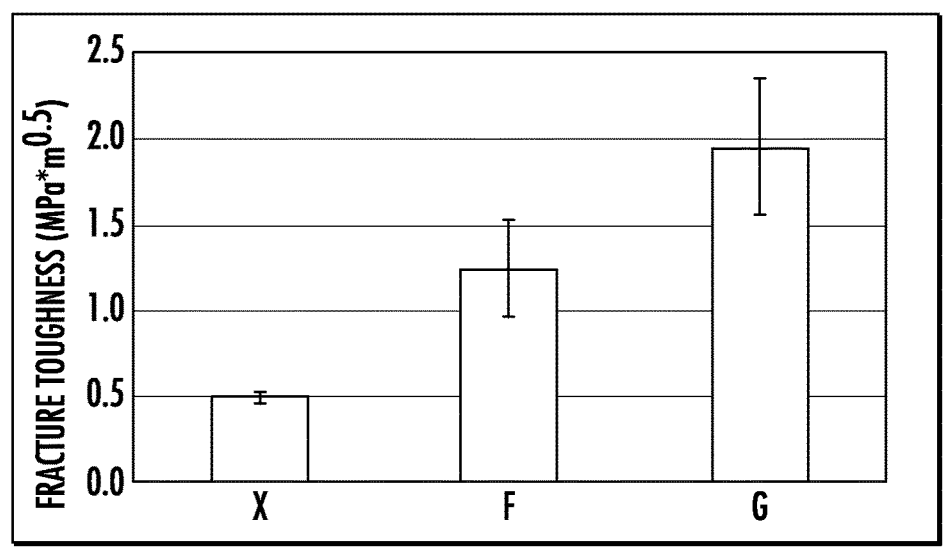
FIG. 12 is a bar chart of fracture toughness for uncoated and coated glass samples measured at 300° C.

FIG. 11A shows the profilometer thickness of a glass sample coated using a doctor blade with a 5 mil gap. FIG. 11B shows the profilometer thickness for a glass sample coated using a doctor blade with a 25 mil gap. It can be observed from both of these profiles that the coating thickness was substantially uniform for both coated samples, with a thickness of 10 µm for sample F and 30 µm for sample G. A DT test was performed at 300° C. and the results are depicted in FIG. 12. An average effective fracture toughness for the coated samples F was 1.25 MPa*m$^{0.5}$, as compared to 0.50 MPa*m$^{0.5}$ for the uncoated sample, a 150% improvement. The average effective fracture toughness for the coated samples G was 1.96 MPa*m$^{0.5}$, a 292% improvement over the control samples. These results show that thicker and/or more uniform coatings can provide greater improvement in fracture toughness.

Example 11: Coating Thickness/Uniformity Variation

Figure 13:
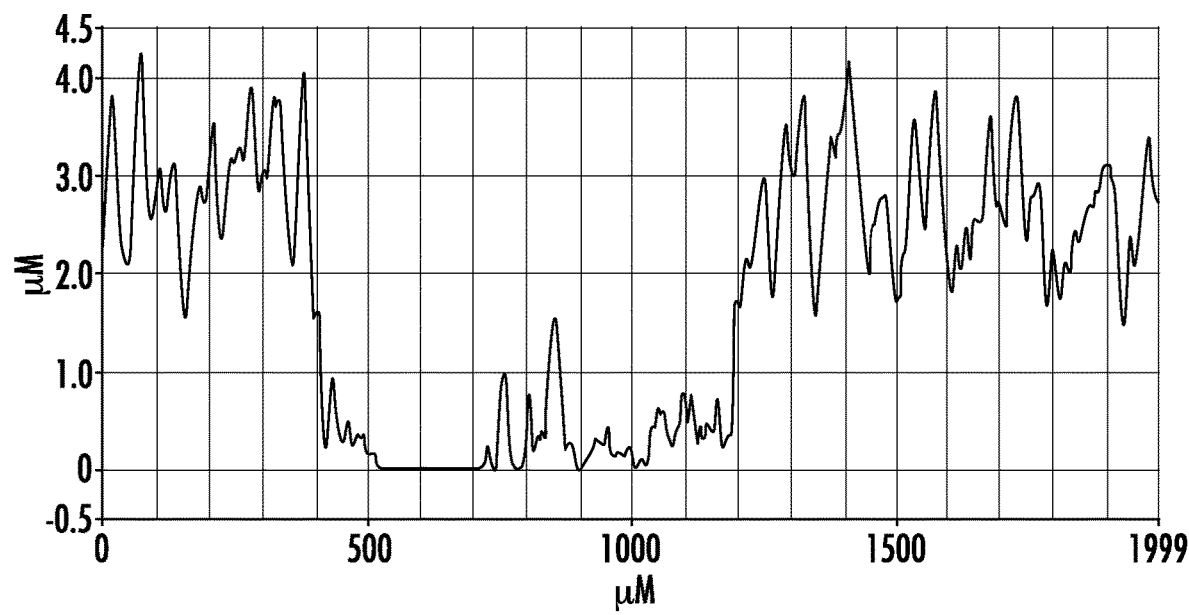
FIG. 13 is profilometer thickness profiles for exemplary polymer coatings.

Two Corning® Gorilla® Glass (code 5318) samples (20 mm×40 mm) were coated with the 1 wt % coating solution used in samples B of Example 5. The glass samples were heated to 350° C. and coated on one side. The coating was sprayed by a single airbrush with a doubled spraying capacity as compared to the airbrush used in Examples 2-9. The airbrush was operated at a pressure of 15 psi for a time period of 5 or 15 seconds, followed by curing for 10 minutes. The thickness of the coating on both samples was evaluated using a profilometer. FIG. 13 depicts the thickness profile of the coating produced using a spray time of 15 seconds (J). As compared to the profile of sample B depicted in FIG. 8B, it can be appreciated that the profile for the sample J produced with the airbrush with doubled capacity was both more uniform and thicker (1.5-4.2 µm for sample J as compared to 0.3 µm to 1.5 µm for sample B). The samples produced using a spray time of 5 seconds (H) had a thickness of 0.5 µm to 2.4 µm, which was also greater than the thickness for sample B, but thinner than the thickness for sample J with a longer spray time.

Figure 14:
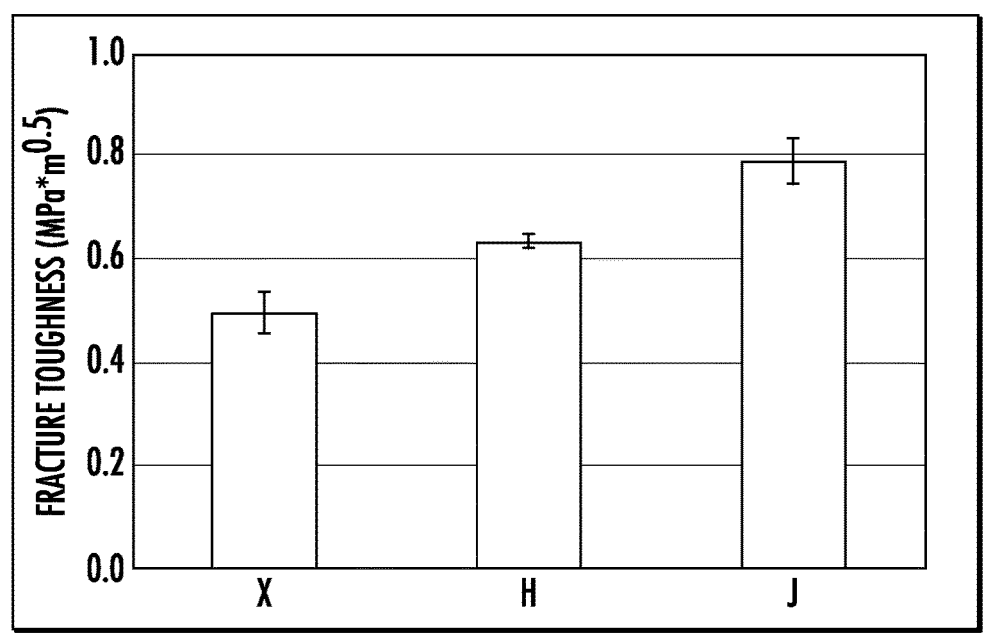
FIG. 14 is a bar chart of fracture toughness for uncoated and coated glass samples measured at 300° C.

A DT test was performed at 300° C. and the results are depicted in FIG. 14. The average effective fracture toughness for coated samples H was 0.64 MPa*m$^{0.5}$, a 28% improvement over the uncoated control sample X. The average effective fracture toughness for coated samples J was 0.79 MPa*m$^{0.5}$, a 59% improvement over the uncoated control sample X. This result shows that thicker and/or more uniform coatings can provide greater improvement in fracture toughness.

Example 12: Curing Time

Two Corning® Gorilla® Glass (code 5318) samples (20 mm×40 mm) were coated with different polyimide precursor coating solutions to evaluate the impact of curing time of fracture toughness improvement. The first polyimide precursor solution was prepared by diluting a PMDA-ODA PAA stock solution from Sigma Aldrich (15 wt % in 1-methyl-2-pyrrolidone (NMP)) to produce a 2 wt % solution. The second polyimide precursor solution was prepared by diluting a VETC 1388 PI stock solution from R. Blaine Industries (20 wt % in NMP) to produce a 2 wt % solution. The glass samples were heated to 400° C. and coated over the entirety of one side. The coating was sprayed by a single airbrush with a doubled spraying capacity as used in Example 11. The airbrush was operated at a pressure of 15 psi for a time period of 2 or 5 seconds, followed by curing for 3 seconds, 4 seconds, 30 seconds, and 300 seconds. The coating conditions are provided in Table IV below.

TABLE IV

| Coating Conditions | | | |
|---|---|---|---|
| | K | L | M |
| Polyimide | PMDA-ODA PAA | PMDA-ODA PAA | PMDA-ODA PAA |
| Concentration | 2 wt % | 2 wt % | 2 wt % |
| Spray Time | 5 sec | 5 sec | 5 sec |
| Spray Pressure | 30 psi | 30 psi | 30 psi |
| Curing Temperature | 400° C. | 400° C. | 400° C. |
| Curing Time | 3 sec | 30 sec | 300 sec |
| | N | O | P |
| Polyimide | VTEC 1388 PI | VTEC 1388 PI | VTEC 1388 PI |
| Concentration | 2 wt % | 2 wt % | 2 wt % |
| Spray Time | 2 sec | 2 sec | 2 sec |
| Spray Pressure | 30 psi | 30 psi | 30 psi |
| Curing Temperature | 400° C. | 400° C. | 400° C. |
| Curing Time | 4 sec | 30 sec | 300 sec |

Figure 15:
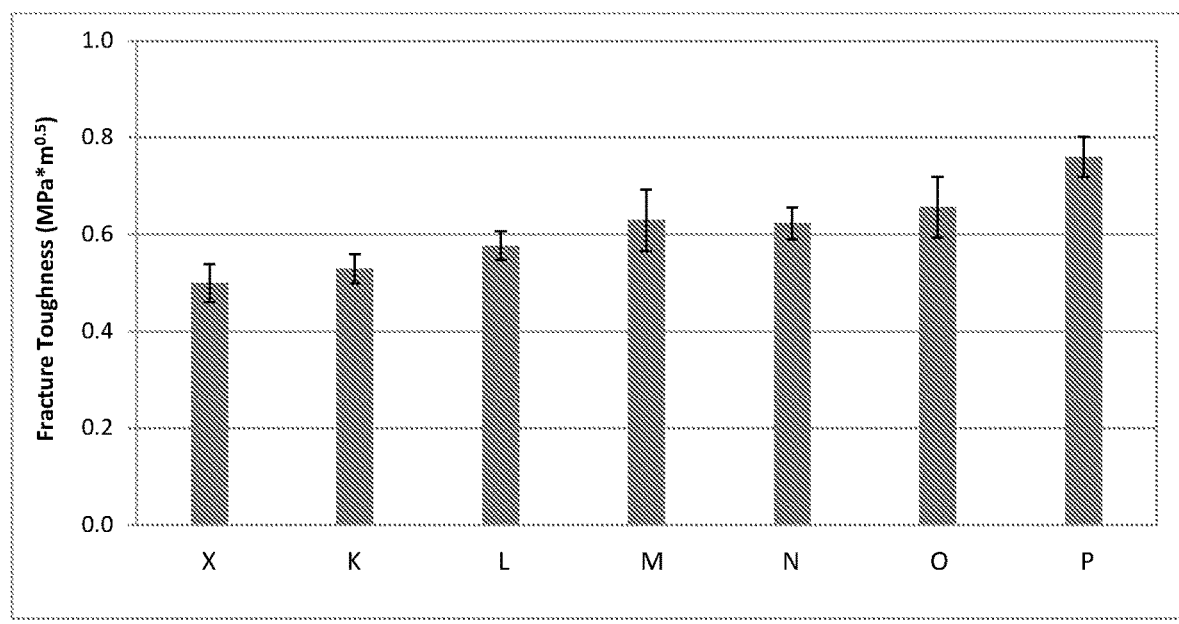
FIG. 15 is a bar chart of fracture toughness for uncoated and coated glass samples measured at 300° C.

A DT test was performed at 300° C. and the results are depicted in FIG. 15. For the same precursor solution, it can be observed that longer curing times led to greater improvement in fracture toughness. Whereas the 2 wt % PMDA-ODA PAA coating solution after 3 seconds of curing (coated sample K) resulted in a 5.8% improvement in fracture toughness over the uncoated control sample X, the same coating solution cured for 300 seconds resulted in a 25.8% improvement over the control. In comparison, the 2 wt % VTEC 1388 PI coating solution resulted in a 24.6% improvement in fracture toughness over the control sample X after only 4 seconds of curing. Without wishing to be bound by theory, it is believed, based on vendor information, that VETC 1388 PI cures faster than PMDA-ODA PAA and thus results in a higher fracture toughness in a shorter curing time.

It will be apparent to those skilled in the art that various modifications and variations can be made to embodiments of the present disclosure without departing from the spirit and scope of the disclosure. Thus it is intended that the present disclosure cover such modifications and variations provided they come within the scope of the appended claims and their equivalents.

What is claimed is:

1. A method for forming a glass sheet, comprising:
   melting glass batch materials to form molten glass;
   processing the molten glass to form a glass ribbon comprising a first major surface and a second major surface;
   applying a polymer precursor to at least a portion of at least one of the first major surface or the second major surface, a surface temperature of the portion equal to or greater than 300° C.;
   curing the polymer precursor to form a polymer coating, the curing comprising in situ thermal curing at a curing temperature from 300° C. to 600° C. for a time period less than about 10 seconds; and
   separating the glass ribbon to produce at least one glass sheet.

2. The method of claim 1, wherein the curing consists of in situ thermal curing.

3. The method of claim 1, wherein applying the polymer precursor comprises applying a solution comprising at least one polymer precursor and at least one solvent.

4. The method of claim 1, wherein applying the polymer precursor comprises spray coating.

5. The method of claim 1, wherein the polymer coating comprises a polymer chosen from polyimides, polyamides, polysulfones, polybenzimidazoles, silicones, epoxies, acrylates, and combinations thereof.

6. The method of claim 1, wherein the curing temperature ranging is in a range from about 300° C. to about 450° C. and the time period is in a range from about 3 seconds to about 6 seconds.

7. The method of claim 1, wherein an average thickness of the polymer coating is equal to or less than about 50 μm.

8. The method of claim 1, wherein the first and second major surfaces each comprise a central region and first and second bead regions, and wherein the polymer precursor is applied to at least one of the first or the second bead regions.

9. The method of claim 8, wherein the polymer precursor is not applied to the central region of the first or second major surface.

10. The method of claim 1, wherein the polymer precursor is applied to at least a portion of the first major surface and at least a portion of the second major surface.

11. The method of claim 1, wherein separating the glass ribbon comprises scoring the glass ribbon to produce at least one score line, the at least one score line positioned in a region of the glass ribbon comprising the polymer coating.

12. The method of claim 1, wherein separating the glass ribbon comprises removing at least one bead region from the glass ribbon.

* * * * *

UNITED STATES PATENT AND TRADEMARK OFFICE
CERTIFICATE OF CORRECTION

PATENT NO. : 11,603,328 B2
APPLICATION NO. : 16/765303
DATED : March 14, 2023
INVENTOR(S) : Curtis Robert Fekety et al.

It is certified that error appears in the above-identified patent and that said Letters Patent is hereby corrected as shown below:

In the Claims

In Column 20, Line 30, in Claim 6, after "temperature" delete "ranging."

Signed and Sealed this
Twenty-seventh Day of June, 2023

*Katherine Kelly Vidal*

Katherine Kelly Vidal
*Director of the United States Patent and Trademark Office*